United States Patent [19]

Haneda et al.

[11] Patent Number: 5,623,612
[45] Date of Patent: Apr. 22, 1997

[54] DATA PROCESSING APPARATUS PROVIDING CHARACTER STRING COPYING

[75] Inventors: Isamu Haneda, Kyoto; Katsunori Okuda, Nara, both of Japan

[73] Assignee: Sharp Kabushiki Kaisha, Osaka, Japan

[21] Appl. No.: 605,650

[22] Filed: Feb. 22, 1996

Related U.S. Application Data

[63] Continuation of Ser. No. 98,901, Jul. 29, 1993, abandoned.

[30] Foreign Application Priority Data

Jul. 30, 1992 [JP] Japan .................................. 4-203490

[51] Int. Cl.⁶ ........................................................ G06F 3/14
[52] U.S. Cl. ............................................ 395/326; 395/333
[58] Field of Search .................................. 395/155, 156, 395/157, 158, 159, 160, 161, 164, 600, 700

[56] References Cited

U.S. PATENT DOCUMENTS

| | | | |
|---|---|---|---|
| 4,739,477 | 4/1988 | Barker et al. | 395/600 |
| 4,905,185 | 2/1990 | Sakai | 395/146 |
| 5,063,600 | 11/1991 | Norwood | 382/13 |
| 5,157,763 | 10/1992 | Peters et al. | 395/157 |
| 5,251,291 | 10/1993 | Malcolm | 395/146 |
| 5,309,555 | 5/1994 | Akins et al. | 395/157 |
| 5,367,623 | 11/1994 | Iwai et al. | 395/157 |
| 5,371,851 | 12/1994 | Pieper et al. | 395/164 |

FOREIGN PATENT DOCUMENTS

| | | |
|---|---|---|
| 63-26909 | 6/1988 | Japan . |
| 113146 | 3/1989 | Japan . |

*Primary Examiner*—Mark R. Powell
*Assistant Examiner*—Ruay Lian Ho

[57] ABSTRACT

The data processing apparatus of the invention is intended to operate and process promptly by displaying information in plural screens at a time, and touching the position or title area of the screen to be copied, thereby copying the copy character string easily and simply, and saving key input manipulations in the operating machine. When the touch position is within the screen of action board, the cursor is moved to the touch position (S24) to judge if there is copy character string or not (S25), and if copy character string is not found, the flow chart is terminated. If copy character string is found, the copy character string is put into the cursor position of the action board (S26). This judgment if there is copy character string or not (S25) includes the judgement if there is copy character string for making character strings other than the copy character string invalid for copying and making only the copy character string valid or not.

21 Claims, 25 Drawing Sheets

Fig. 18 (1)
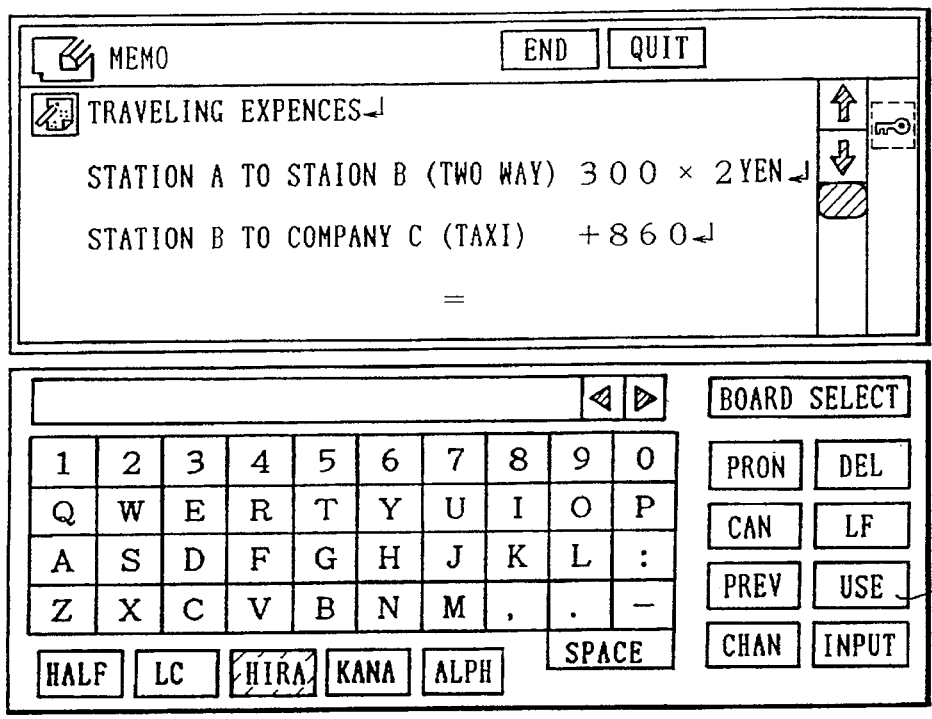
Fig. 18 (2)
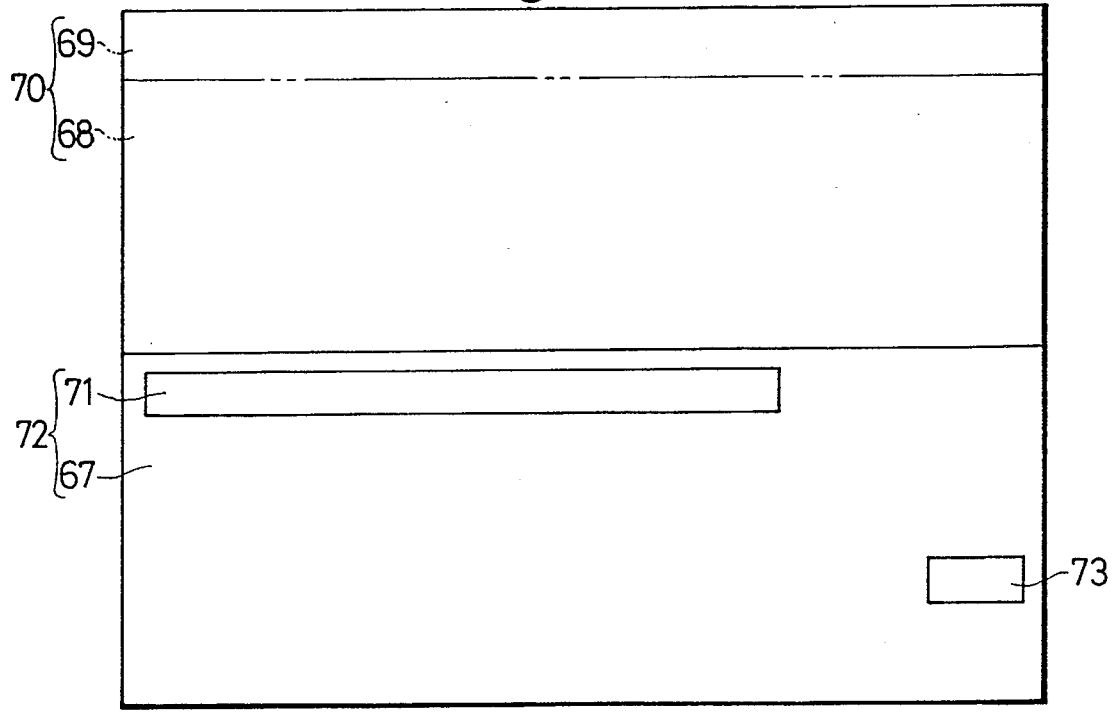

Fig. 20 (1)
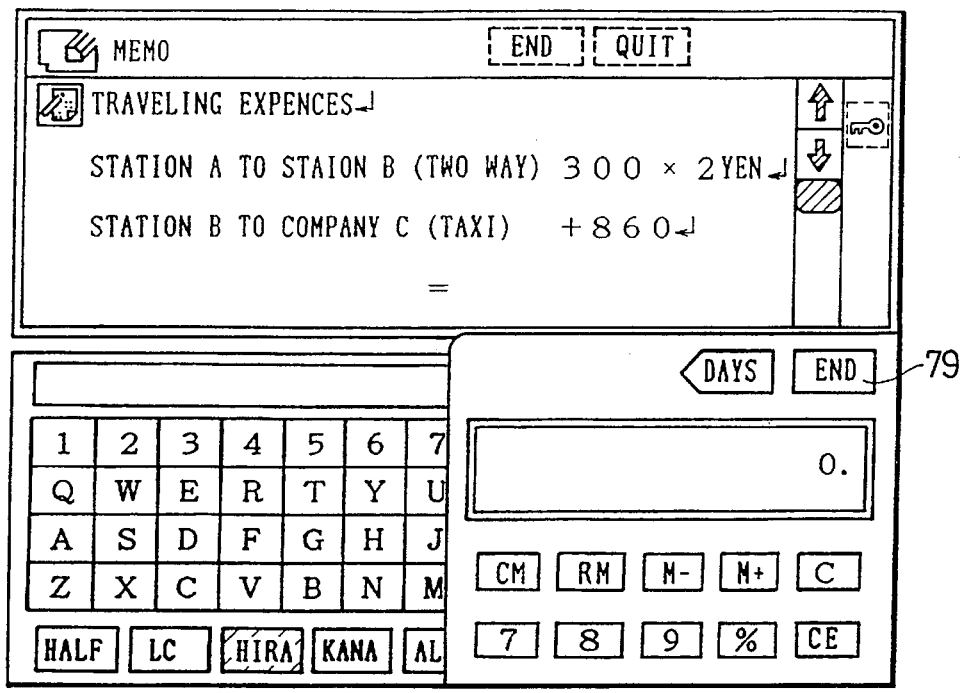
Fig. 20 (2)
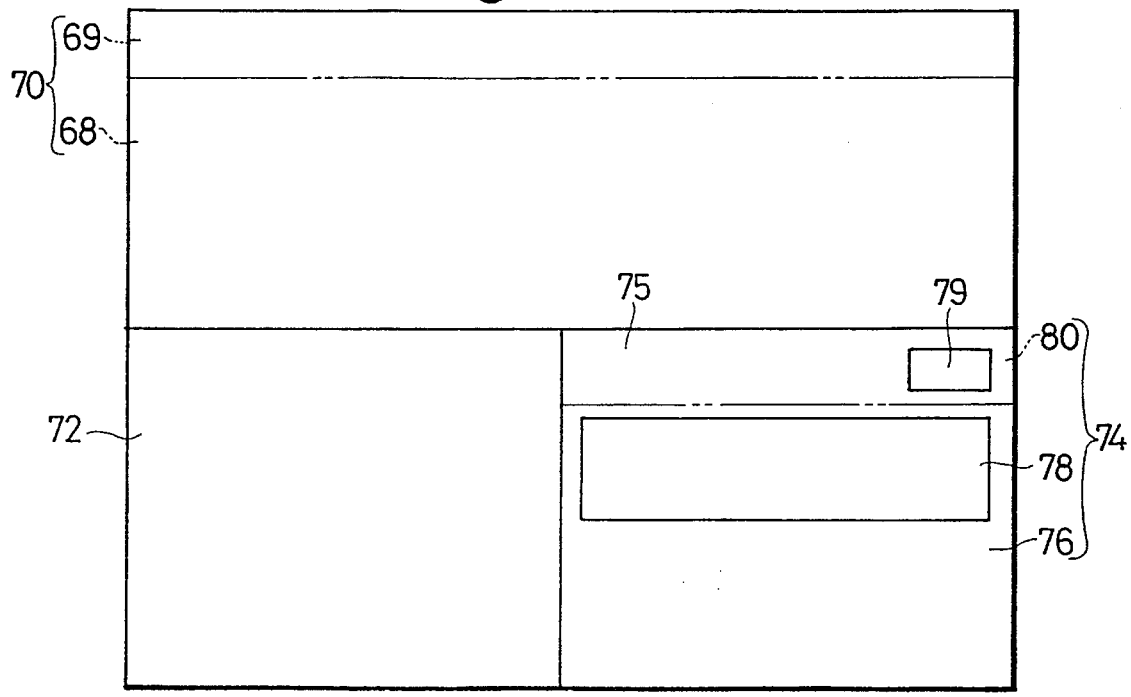

Fig. 25

STATION A TO STATION B (TWO WAY) 300 × 2 YEN↵STATION B TO COMPANY C (TAXI) + 860↵=

Fig. 26

$$
\begin{aligned}
&\vdots \\
3 &\leftarrow 3 \\
30 &\leftarrow 0 \\
300 &\leftarrow 0 \\
300 &\leftarrow \times \\
2 &\leftarrow 2 \\
2 &\leftarrow Y \\
&\vdots \\
2 &\leftarrow S \\
2 &\leftarrow T \\
2 &\leftarrow A \\
&\vdots \\
600 &\quad + \\
860 &\quad = 1460
\end{aligned}
$$

DATA PROCESSING APPARATUS PROVIDING CHARACTER STRING COPYING

This application is a continuation, of application Ser. No. 08/098,901 filed on Jul. 29, 1993, now abandoned.

BACKGROUND OF THE INVENTION

1. Field of the Invention

The present invention relates to a data processing apparatus having display device which is incorporated in portable information terminal device such as electronic organizer, document creating apparatus used in personal computer, or document creating apparatus of word processor.

2. Description of the Related Art

In the conventional data processing apparatus, by opening the information of plural screens, a part of information of one screen (copy source) may be copied into information of other screen (copy source). In this operation, after a character string of the copy source is specified and "copy" is executed, there is required a operation of "paste" on other screen (copy destination).

In FIG. 29, screen B is overlaid on the basic screen of A, and it can be distinguished which one of the two screens A and B is the object of processing (input or display) in the upper part of the screen. That is, of the A1, B1 in the title area, the White-Black reversed title character string A1 is the object of processing.

In FIG. 30, character string CDE on screen A is specified as A2 and is displayed reversely in White-Black manner.

FIG. 31 is a diagram showing the state that the copy key has been pressed for copying character string CDE.

In FIG. 32, a part of screen B is touched to specify screen B as the object of processing, in which the pasting position is specified as position 2 of screen B by finger or pen, and the cursor B2 is moved to this position and shown beneath the FIG. 2.

In FIG. 33, by pressing the paste key 82, CDE is pasted between 1 and 2 of screen B.

In the conventional data processing apparatus, the operation requires four steps, that is, specification of character string A, operation of "copy" key 81, change of screen (from A to B), and operation of "paste" key 82. Hence, the manipulation is complicated, and the speed of processing is slow.

SUMMARY OF THE INVENTION

It is hence a primary object of the invention to copy a character string in two steps, that is, specification of character string and touching of the pasting position, in order to move or copy the information easily.

The invention presents a data processing apparatus comprising:

means for displaying information of plural screens by overlaying on one screen, means for specifying the cursor position in a copying area of the copy destination screen in the screens displayed by the display means, means for detecting the position specified by the cursor, means for storing a character string of copy source, means for specifying the copying character string by reading out the character string stored in the storing means, displaying as one screen of copy destination in the display means, and specifying the character string portion to be copied of the displayed character string, and means for copying the character string portion specified in the specified position, from the display screen of copy destination into the copy destination display screen in response to the output from the copying character string specifying means.

The invention also presents a data processing apparatus comprising:

means for displaying information of plural screens by overlaying on one screen, means for specifying the cursor position in a copying area of the copy destination screen in the screens displayed by the display means, means for detecting the position specified by the cursor, means for storing a character string of copy source, means for specifying the copying character string by reading out the character string stored in the storing means, displaying as one screen of copy destination in the display means, and specifying the character string portion to be copied of the displayed character string, means for judging whether the specified character string portion is in a copiable region of the display screen or not, in response to the copying character string specifying means, and means for copying the character string portion specified in the specified position, in the copy destination display screen from the display screen of copy destination, in response to the judging means.

It is also a feature of the invention to invalidate the character string other than the copy object when copying, and validate only the copy object characters.

In the invention, the means for specifying the cursor position and the copying character string specifying means are transparent touch panels laid over the screen of the display means, wherein the touch panels are composed of switching elements smaller than the size of each character display on the screen being displayed in a matrix.

The invention moreover provides a data processing apparatus comprising:

means for displaying information of plural screens by overlaying on one screen, means for specifying the cursor position in a copying area of the copy destination screen in the screens displayed by the display means, means for detecting the position specified by the cursor, means for storing a character string of copy source, means for specifying the copying character string by reading out the character string stored in the storing means, displaying as one screen of copy destination in the display means, and specifying the character string portion to be copied of the displayed character string, means for copying the character string portion specified in the specified position, in the copy destination display screen from the display screen of copy destination, in response to the output from the copying character string specifying means, and arithmetic means for operating the copying character strings corresponding to the display content of the copy source display screen when copying.

The invention still more provides a data processing apparatus comprising:

means for displaying information of plural screens by overlaying on one screen, means for specifying the cursor position in a copying area of the copy destination screen in the screens displayed by the display means, means for detecting the position specified by the cursor, means for storing a character string of copy source, means for specifying the copying character string by reading out the character string stored in the storing means, displaying as one screen of copy destination in the display means, and specifying the character string portion to be copied of the displayed character string, means for judging whether the specified character string portion is a copiable region of the display screen or not, in response to the copying character string specifying means, means for copying the character string portion specified in the specified position, in the copy destination display screen from the display screen of copy destination, in response to the judging means, and arithmetic means for operating the copying character strings corresponding to the display content of the copy source display screen when copying.

In the invention, the cursor specifying means is composed of a touch panel.

The invention also presents an arithmetic apparatus comprising:

means for displaying screen information, means for inputting numericals, arithmetic symbols and other characters, a memory for storing the characters entered by the input means and displaying in the display means, means for running an instruction of operation, and arithmetic means for reading out the memory content in response to the output of the operation instructing means, distinguishing numerals, arithmetic symbols and other characters, and operating according to the distinguished numerals and arithmetic symbols.

It is other feature of the invention to display the result of operation in the position previously instructed by the display means.

According to the invention, a combination of numerals and predetermined symbols other than numerals is entered by the input means, and the numerals contained in this combination are distinguished by the arithmetic means, and are not used in operation.

The invention presents a data copying method comprising steps of;

displaying a copy source screen and a copy destination screen by overlaying on one screen, specifying a character string portion to be copied in the copy source screen, specifying a position of the copy destination screen to be pasted in, and copying the character string to be copied into the specified position to be pasted in.

The invention also presents a data copying method, wherein the head part of the character string to be copied is located for copying in the specified position to be pasted in.

The invention presents a data processing method comprising steps of;

displaying a character string in a screen, specifying a part or all of the character string displayed in the screen, calculating mathematical process included in the specified character string, and outputting a calculating result.

The invention also presents a data processing method comprising steps of specifying the operation result of the screen to a position to be displayed, displaying the operation result in the specified position.

BRIEF DESCRIPTION OF THE DRAWINGS

Other and further objects, features, and advantages of the invention will be more explicit from the following detailed description taken with reference to the drawings wherein:

FIGS. 18(1) and (2) are diagrams showing the display character data of "memo" in a second embodiment of the invention.

FIGS. 20(1) and (2) are diagrams after moving by displaying the operating machine on FIG. 15 in the second embodiment of the invention.

FIG. 25 is a diagram showing the stored content in a copy memory 86 shown in FIG. 24.

FIG. 26 is a diagram for explaining the state that the content of the copy memory is read out and then stored in calculator operation registers 88, 89, 90.

DETAILED DESCRIPTION OF THE INVENTION

Figure 1:
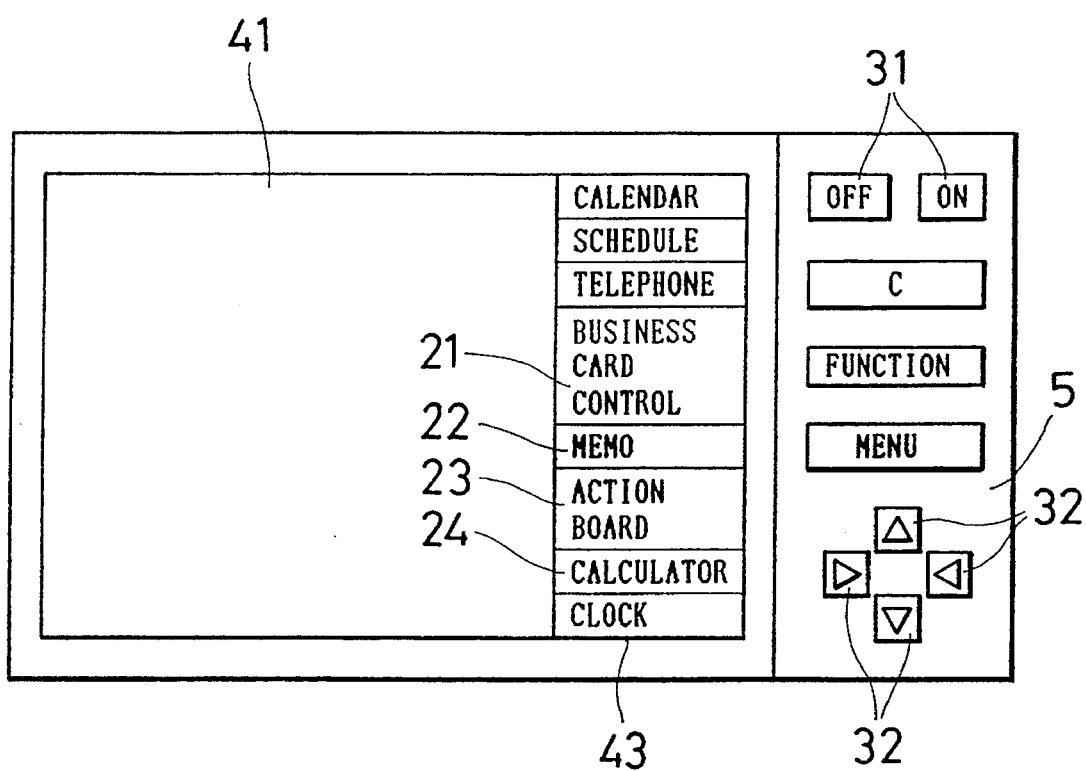
FIG. 1 is an outline diagram of data processing apparatus of the invention.

Now referring to the drawing, preferred embodiments of the invention are described below.

A data processing apparatus of the invention is described in detail with reference to the accompanying drawings as a first embodiment.

Figure 2:
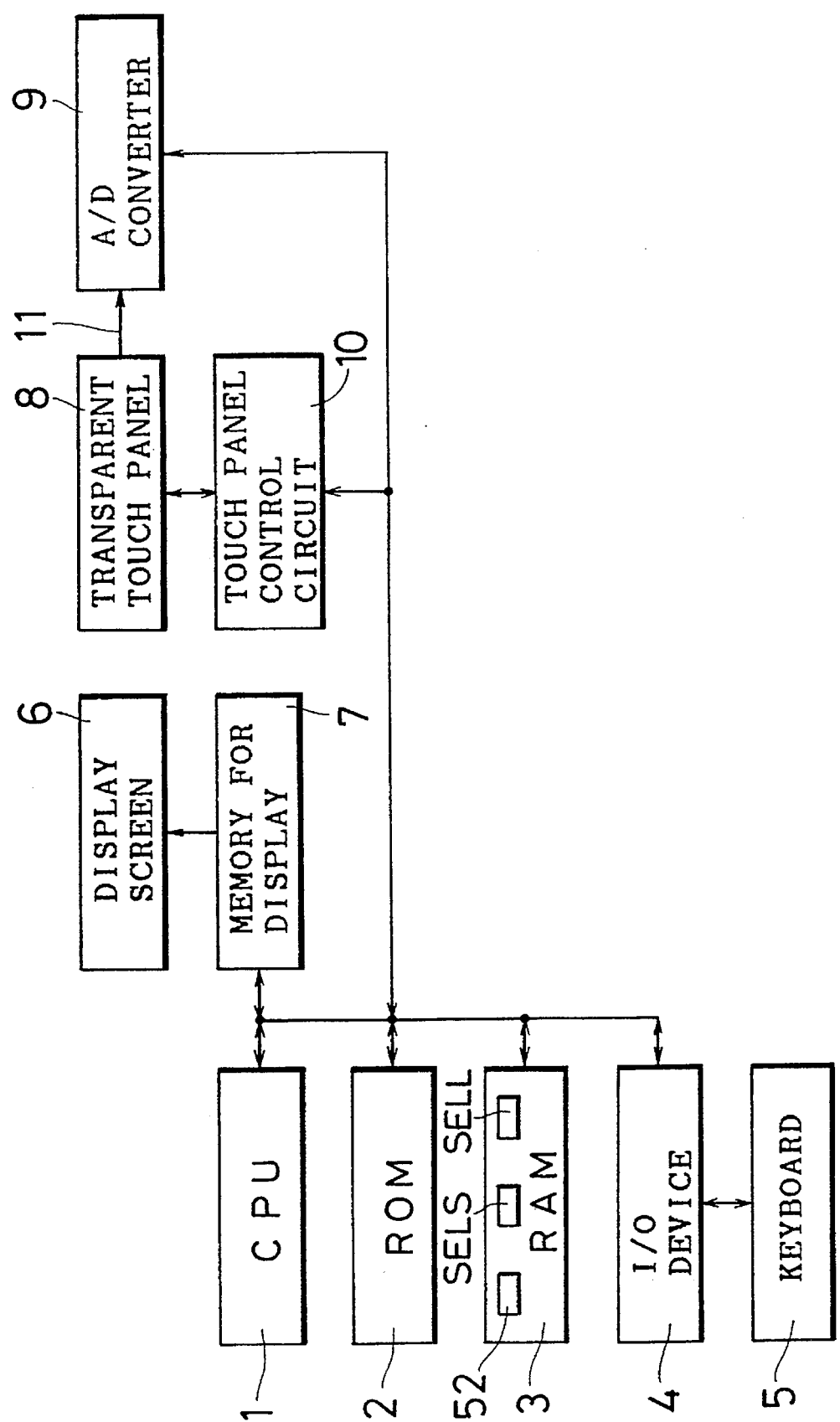
FIG. 2 is a block diagram showing the constitution of data processing apparatus of the invention.

FIG. 1 shows the appearance of the first embodiment of the invention. Display means 6 of FIG. 2 is provided with a display screen or panel 41, in which information and keyboard for input of characters are shown. A transparent touch panel or sheet switch is adhered on the surface of the display screen 41 on which a plurality of switching element is disposed in plane state, and by touching the screen, the position is known by the touch panel 8. Keyboard 5 comprises power on and off keys, cursor move keys 32, and other keys of the minimum limit for assisting the character input. Application selection keys 43 are provided for example, with eight keys, including a business card control key 21, a memory key 22, an action board key 23, and a calculator key 24, among others.

FIG. 2 is a block diagram showing the constitution of the data processing apparatus of the invention. CPU 1 (central processing unit) controls the apparatus according to the control program, and cooperates with other circuits to make various judgements and operations in the copying action. ROM 2 (read only memory) reserves the control program of the apparatus, RAM 3 (Memory capable of reading and writing) stores the work area of the CPU and the data registered by the user. I/O device 4 is provided with the keyboard 5 and other input and output devices which are connected thereof. Keyboard 5 comprises keys 32 and 31 in FIG. 1 and also compromises key 43. Display screen 41 displays information. Thereby a memory for display 7 is provided. Touch panel 8 of transparent analog resistive film type is adhered on the surface of the display element 41 to have a uniform resistance on the whole surface, and produces a voltage (analog value) which is corresponding to the touched position (X, Y coordinates) and is output to line 11 (a signal of 11). A/D converter 9 converts the signal of line 11 into a digital value. Touch panel control circuit 10 controls the voltage application to the transparent touch panel. An analog signal is conducted in line 11.

Figure 3:
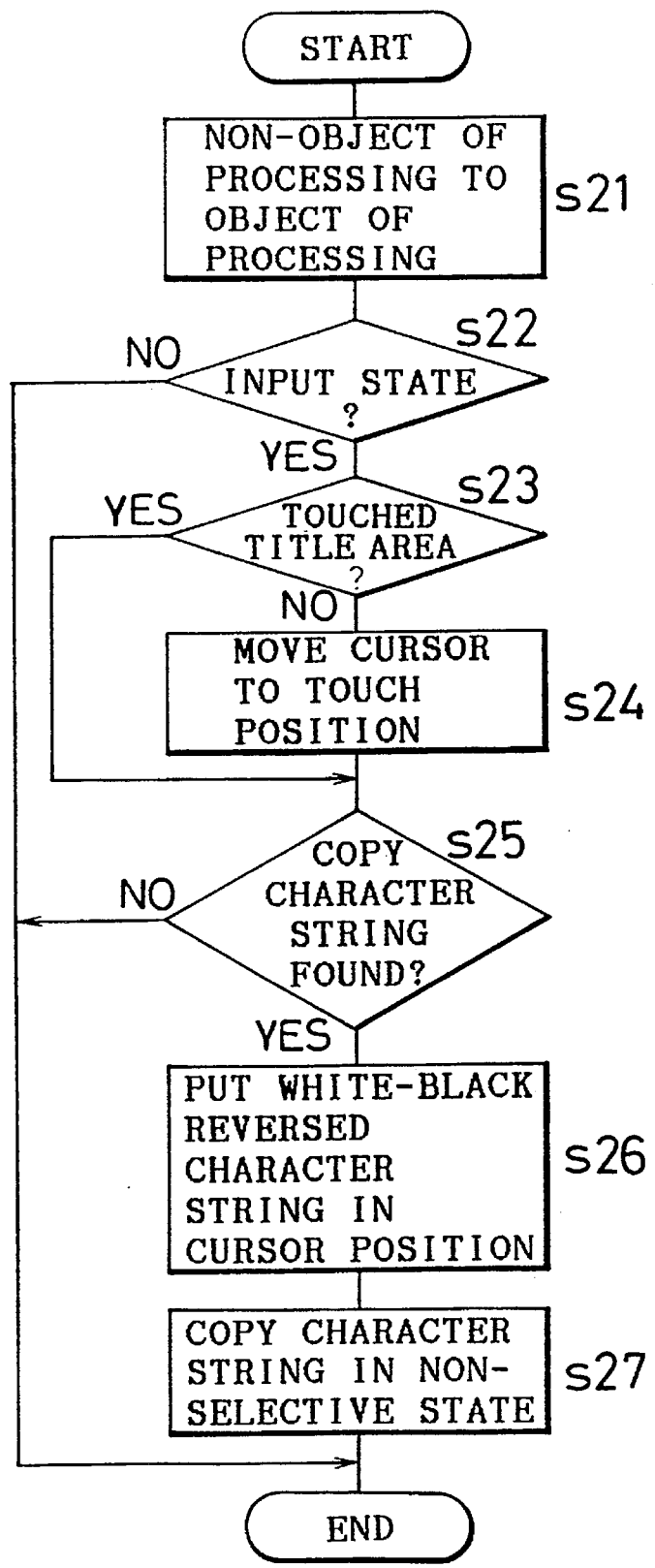
FIG. 3 is a flow chart showing the outline of operation of data processing apparatus of the invention.

A flow chart showing the outline of operation of the data processing apparatus of the invention is given in FIG. 3. The action board is changed from non-object of processing to object of processing accordingly the title area is changed from dim characters to normal characters (step S21 in FIG. 3). The CPU 1 judges whether the action mode is input state or data display state (step S22), and goes out of this flow chart if it is the data display state. In the case of input state, the CPU 1 judges if the touched position is within the screen of the action board or the title area (S23). If the touch position is within the screen of action board, the CPU 1 moves the cursor to the touch position (S24). The CPU 1 judges if there is copy character string or not (S25), and if copy character string is not found, this flow chart is terminated. If copy character string is found, the copy character string is put into the cursor position of the action board (S26). The copy character string is set in non-selected state (S27).

In this flow chart, whether the copy character string is present or not is judged (S25) by the CFU 1, and it includes the judgement if the copy character string making the character strings other than the object of copying invalid for copying and making only the copy object characters valid is present or not, as mentioned in the second embodiment below.

The first embodiment of the data processing apparatus of the invention is described in detail below while referring to drawings.

Figure 4:
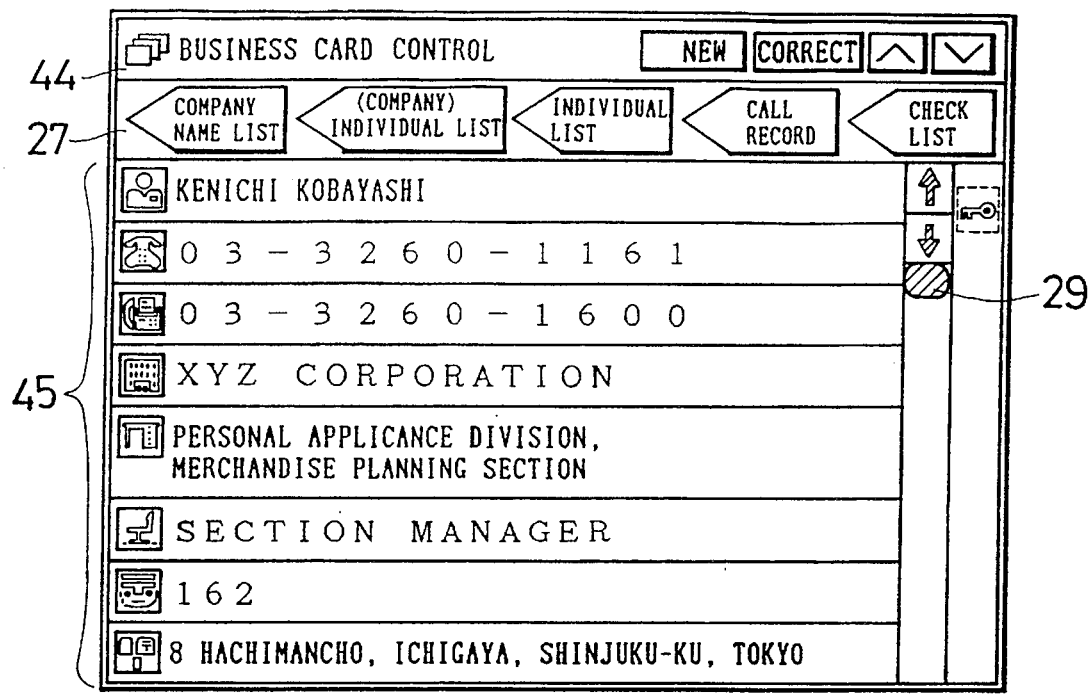
FIGS. 4(1) and (2) are diagrams showing display character data of "business card control" in a first embodiment of the invention.
Figure 4:
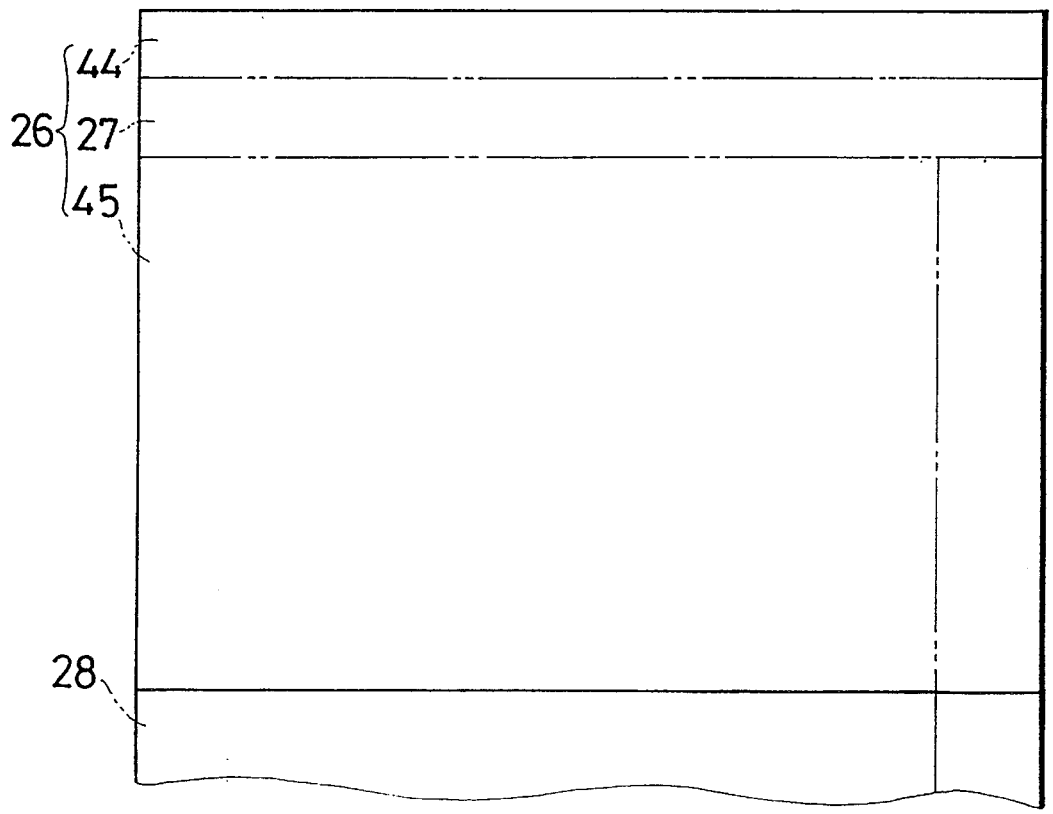
Figure 14:
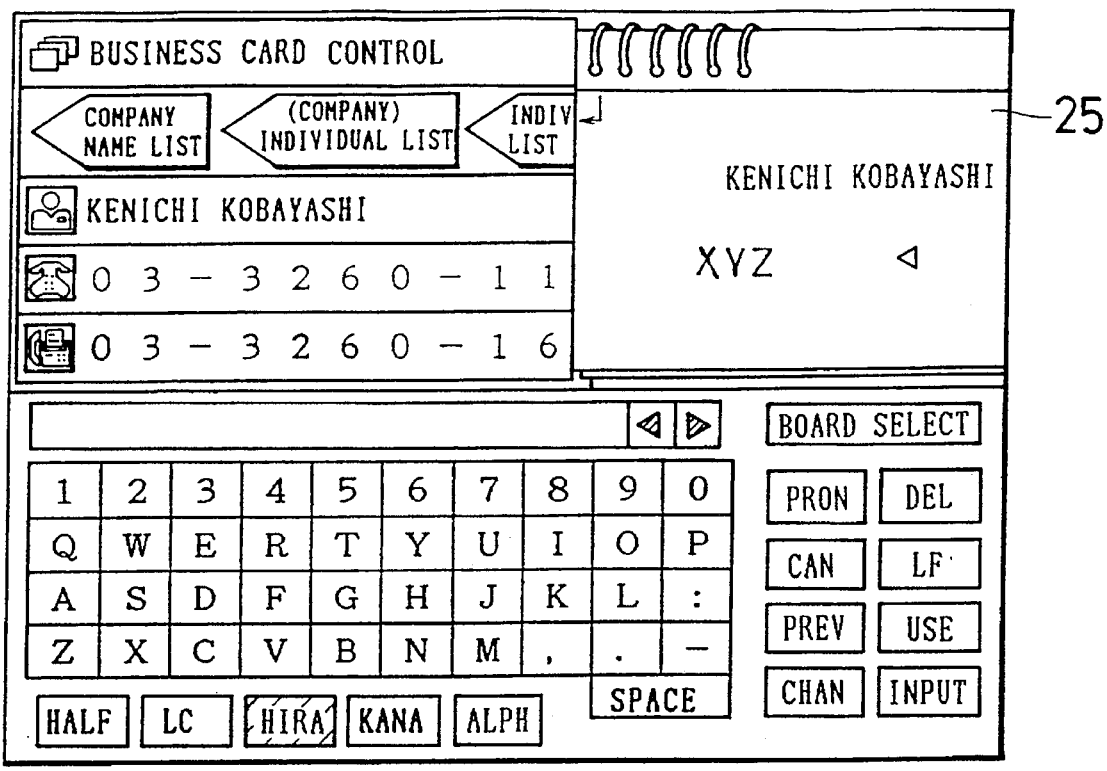
FIG. 14 is a diagram after pasting in the cursor position by copy input in the first embodiment of the invention.

FIG. 4 is a drawing showing the display character data of one case of "business card control." According to the invention, the operation of copying and pasting "KOBAYASHI KENICHI" and his working place "XYZ CORPORATION" shown in the display area 45 of business card control into the display area 25 of the action board in FIG. 14 shown below is achieved in a simple manipulation. The display form in FIG. 4(1) is obtained by pressing the business card control key 21 shown in FIG. 1. The content 26 of the business card control comprises, as simplified in FIG. 4(2), the title area 44, list document selection area 27, and display area 45. The remaining content stored in memory which is not displayed in the display screen 41 of the display area 45 is shown to reference number 28. This content 28 is stored in the memory 3. The display character 29 indicates that the content 28 not displayed in the display screen 41 is present.

Figure 5:
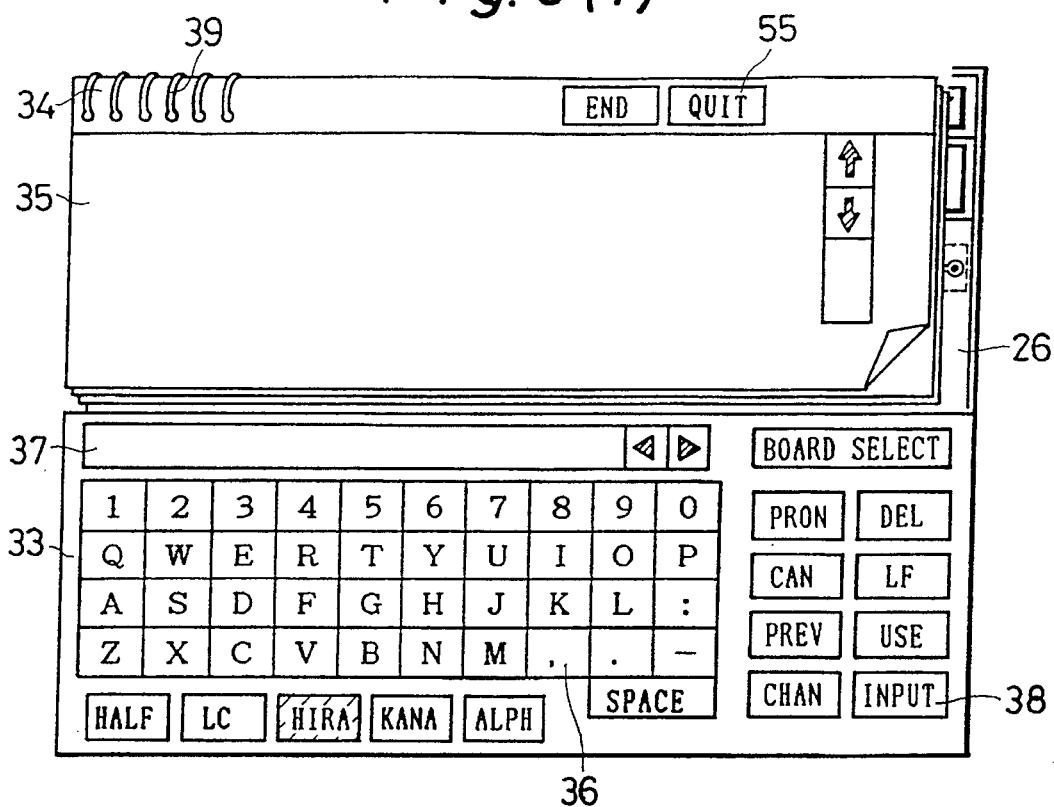
FIGS. 5(1) and (2) are diagrams showing an action board on FIG. 4 in the first embodiment of the invention.
Figure 5:
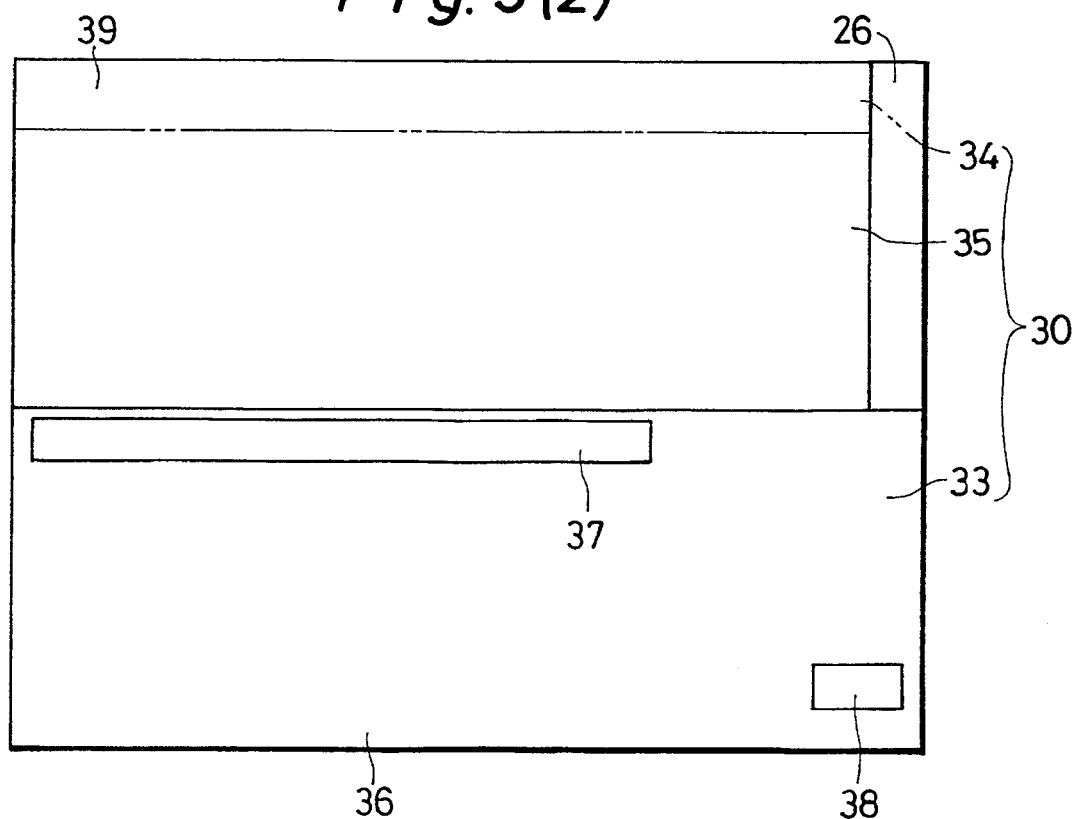

FIG. 5 is a drawing of new input by pressing the action board key 23 of the action board key 20 and opening the screen 30 of action board overlapping the display in FIG. 4, and the upper half of the screen is a display screen of input characters, and the lower half of the screen shows the keyboard 33 for character input. In the upper right corner of the screen, a part of the screen of business card control is shown. That is, the action board 30 comprises a title area 34, a display area 35, and the input area 33, and the input area 33 possesses a keyboard area 36 and an auxiliary display area 37, and also an input key 38 is provided. By manipulating the keyboard area 36, the input character is displayed in the auxiliary display area 37, and then by manipulating the input key 38, the display content of the auxiliary display area 37 can be moved and displayed in the position determined by the cursor of the display area 35. FIG. 5(1) shown an actual display content, and FIG. 5(2) is a diagram simplifying the region of the display screen.

The screen 30 of the action board can be moved; when the screen move touch part 39 in FIG. 5 is shifted vertically or laterally while touching, a part of the screen can be moved out of the screen to the desired position. When the keyboard 33 for character input of the action board and display screen as well as display area 35 are overlapped, the keyboard for character input is displayed by priority, and moreover the screen move touch part is not completely removed from the screen. To erase the action board 30 from the screen, the "quit button 55" in the action board screen is touched.

Figure 6:
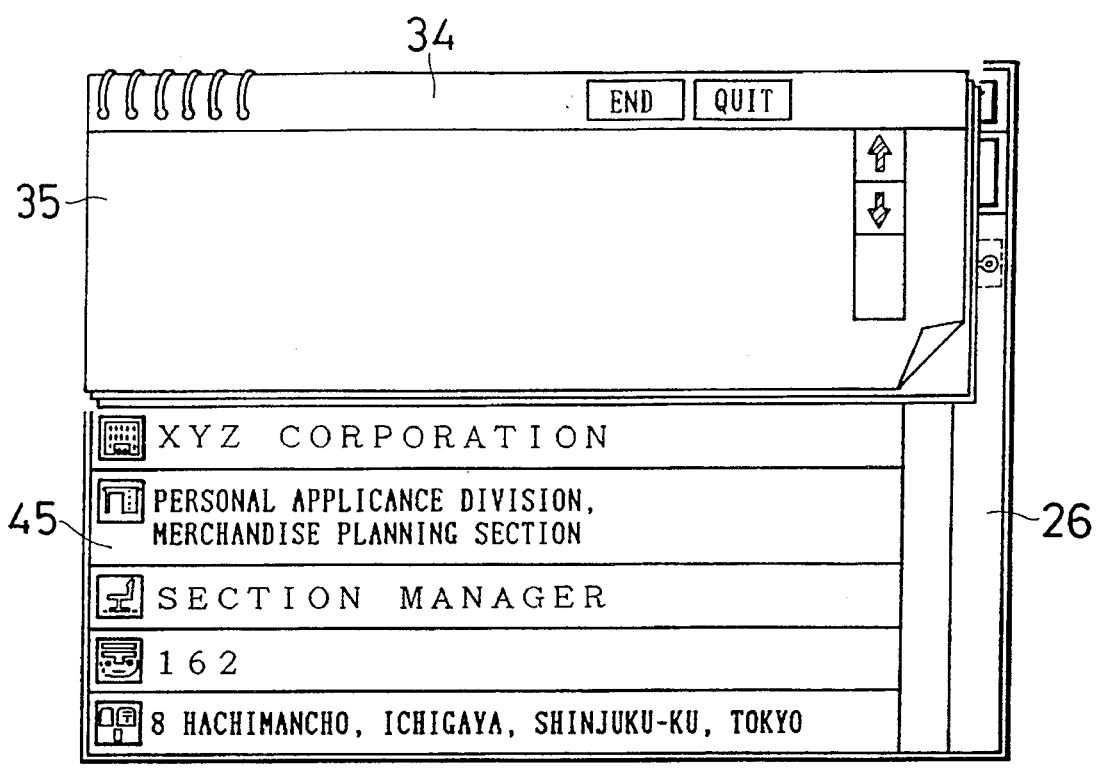
FIGS. 6(1) and (2) are diagrams in which the screen of business card control is the object of processing in the first embodiment of the invention.
Figure 6:
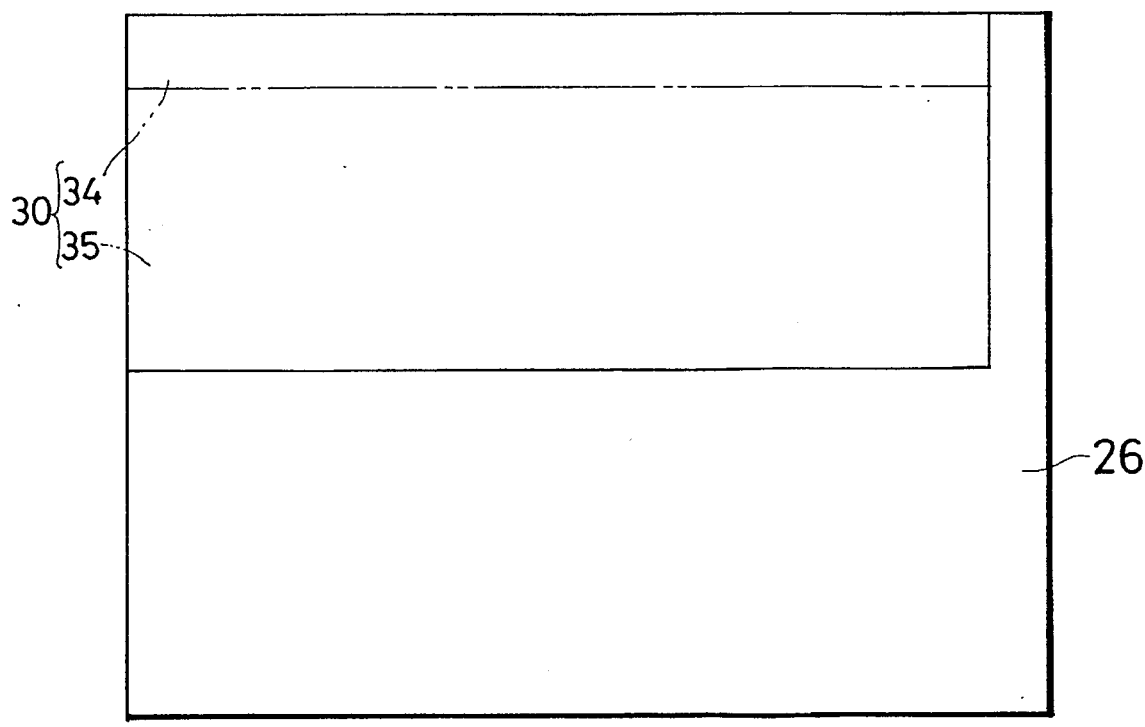

To select the character string of business card control from the state in FIG. 5, when the part 26 in FIG. 5 is touched, the CPU 1 and other circuits are put in action, and the keyboard 33 for character input of the action board 30 disappears as shown in FIG. 6, and only the screens 34 and 35 are left over, and the title display area 34 of the screen of the action board is displayed dimly, telling that the action board 30 is not the object of processing, and the business card control 26 is the object of processing. The keyboard 33 for character input is displayed only when the object of processing is entered, and the keyboard 33 for character input is not displayed when out of the object of processing. FIG. 6(1) shows the display state, and FIG. 6(2) shows each region in the display screen in a simplified form.

Figure 7:
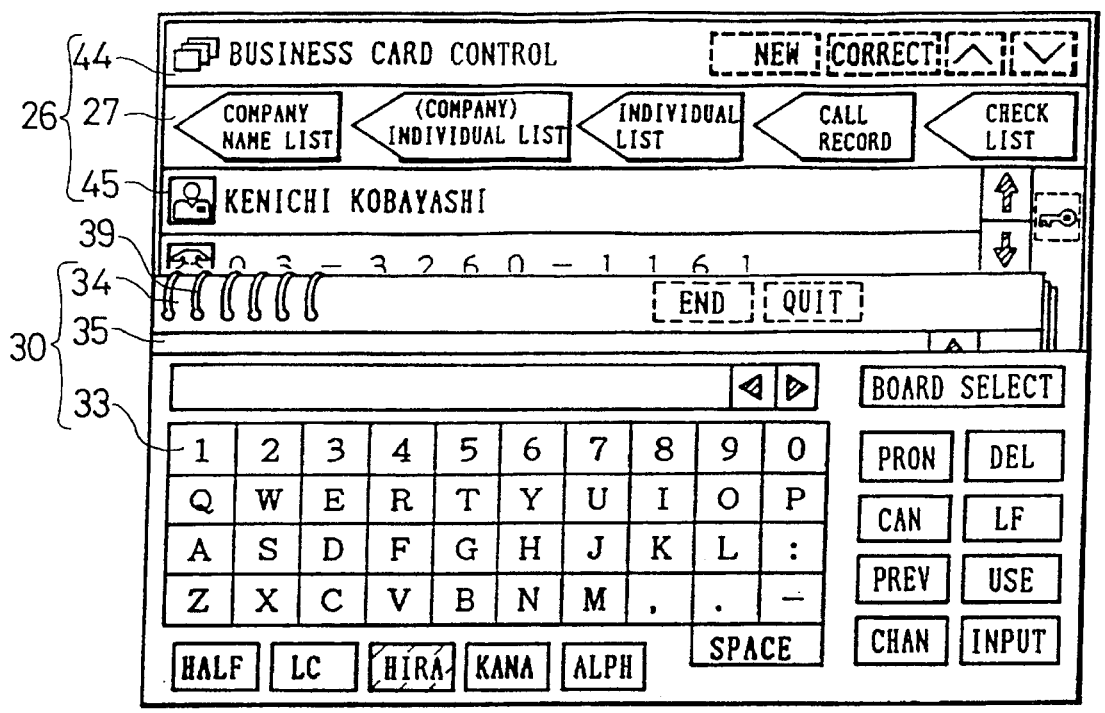
FIGS. 7(1) and (2) are diagrams after moving in which the action board is the object of processing in the first embodiment of the invention.
Figure 7:
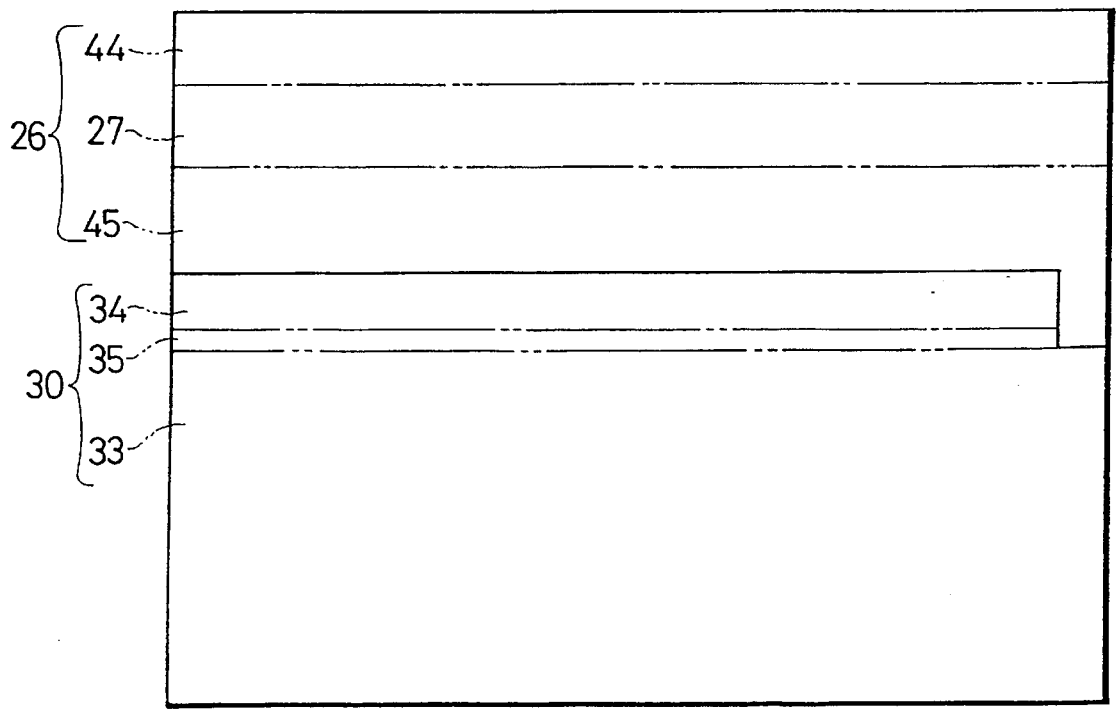

To copy the display character data of the personal name "KOBAYASHI KENICHI" in FIG. 4 in the display area 35 of the action board 30, the interfering action board must be moved so that the character "KOBAYASHI KENICHI" can be displayed. FIG. 7 is a diagram of moving the screen move touch part 39 of the action board 30 by dragging (moving while touching) in order to move the title area 34 and the display area 35 of the action board 34. FIG. 7(1) is a diagram showing the actual display state, and FIG. 7(2) is a simplified diagram showing the region of the display screen. The title display area 34 of the action board becomes a normal display showing the object of processing, and the title display area 34 of business card control is dimly lit to tell it is out of the object of processing. In addition, when the action board becomes the object of processing, the keyboard 33 for character input is displayed, and the screen of the action board 35 is concealed beneath the keyboard 33 used for character input, but the title display area 39 is not concealed beneath the keyboard 33 used for character input.

Figure 8:
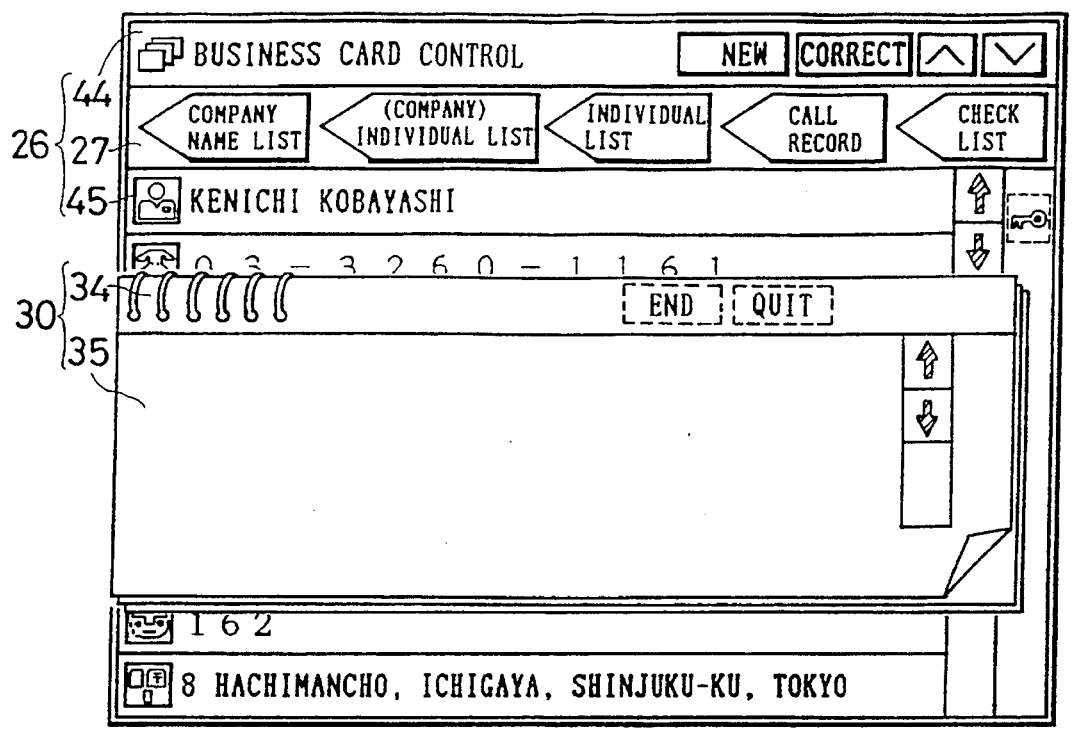
FIGS. 8(1) and (2) are diagrams in which the business card control is the object of processing in the state in FIG. 7 in the first embodiment of the invention.
Figure 8:
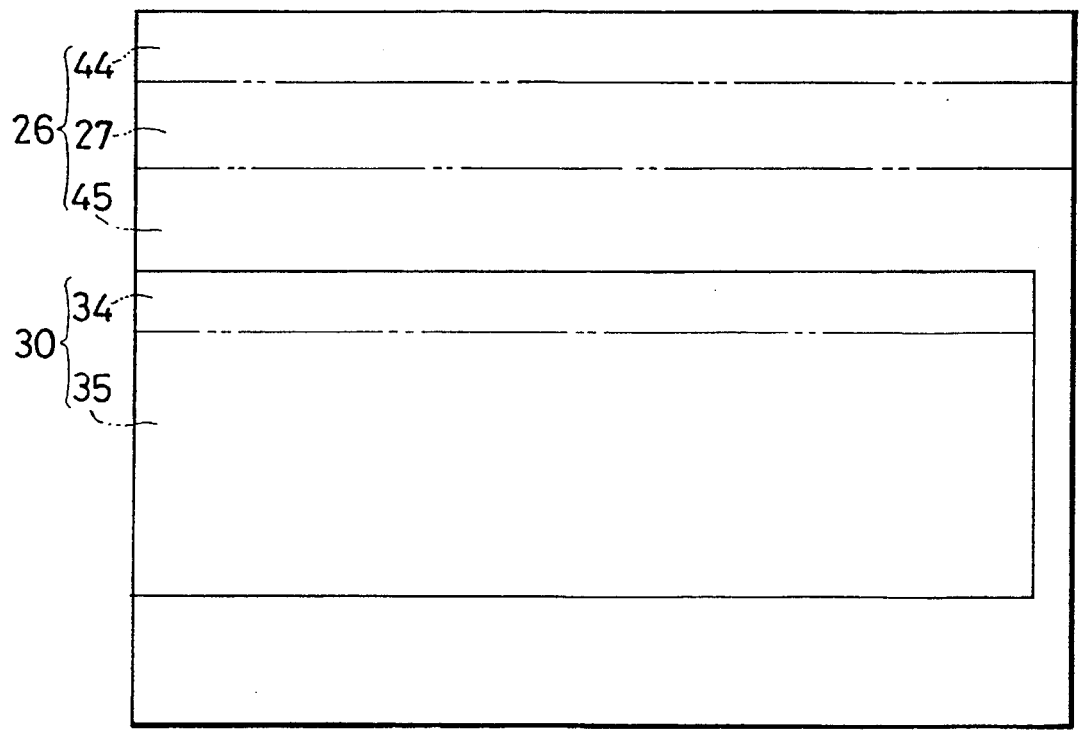

FIG. 8 is a diagram in which the object of processing is the business card control, by touching the screen of business card control in the state in FIG. 7. FIG. 8(1) is a diagram showing the actual display state, and FIG. 8(2) is a simplified diagram showing the region of the display screen. That is, for example, by pressing and touching any position in the region 26 of business card control in FIG. 7, the title area 44 in the region 26 of business card control is displayed in dark state, and hence the region of the business card control 26 can be specified as the copy source. At this time, the input area 33 of the action board 30 in FIG. 7 is erased.

Figure 9:
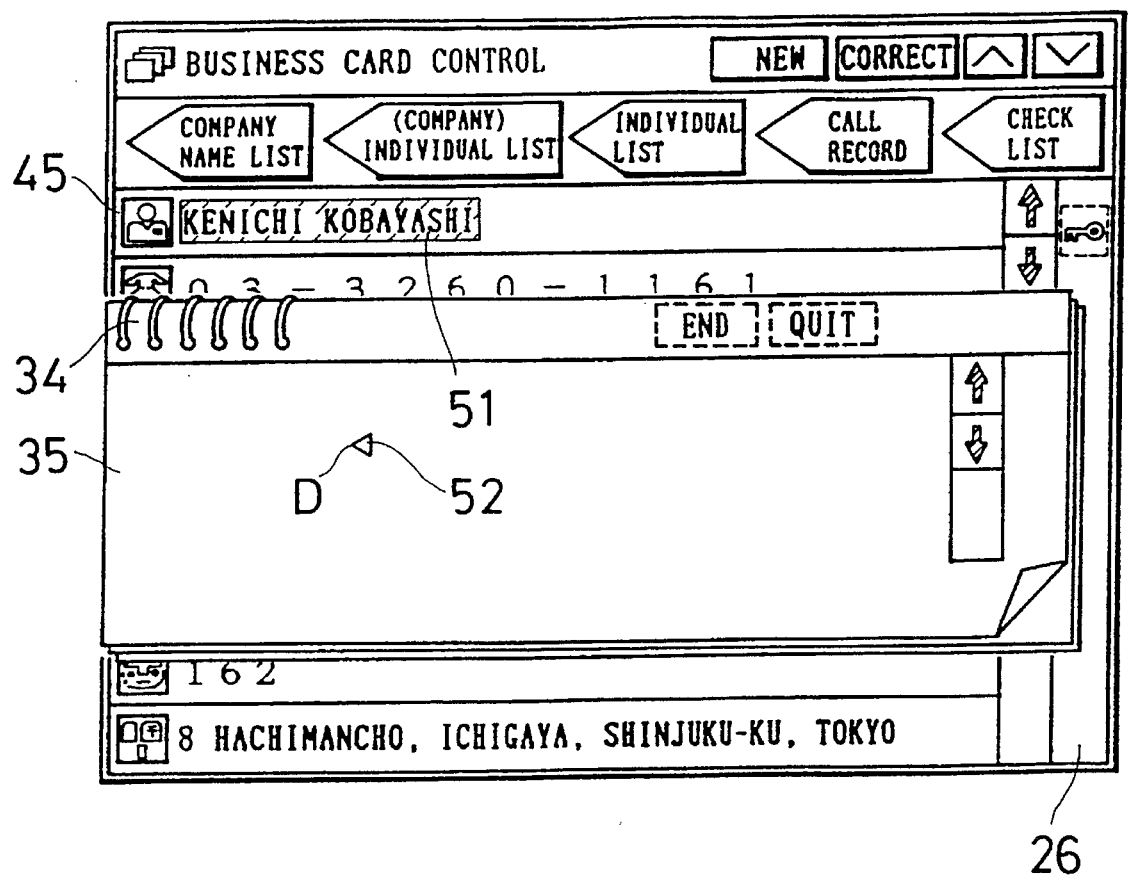
FIG. 9 is a diagram in which the display character data of business card control is specified as the copy character string in the first embodiment of the invention.

FIG. 9 is a White-Black reversed display by specifying the display character data of the personal name KOBA-YASHI KENICHI in display area 45 by means of pressing linearly. Hence, the character string at the copy source "KOBAYASHI KENICHI" is White-Black reversed.

The copy character string is stored in the work area 52 of RAM in FIG. 2, and two pointers, SELS and SELL, are prepared as control works, and the beginning address is specified in SELS, and the length of character string in SELL. SELL=0 means there is no copy character string. To copy KOBAYASHI KENICHI which is the copy character string and personal name in the position D of the copy destination of display area 35 in the action board 30, the position D is touched, then the object of processing is transferred to the action board, and the cursor 52 can be moved to the touched position. Therefore, the copy character string can be pasted to the cursor position.

Figure 10:
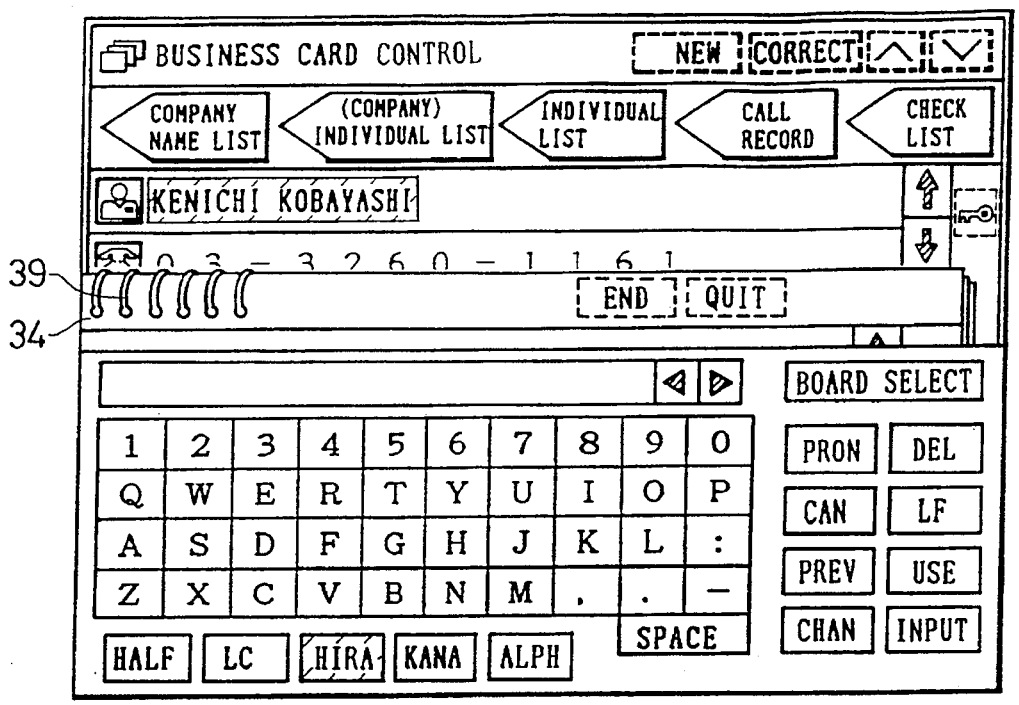
FIGS. 10(1) and (2) are diagrams after pasting in the touch position by copy input in the first embodiment of the invention.
Figure 10:
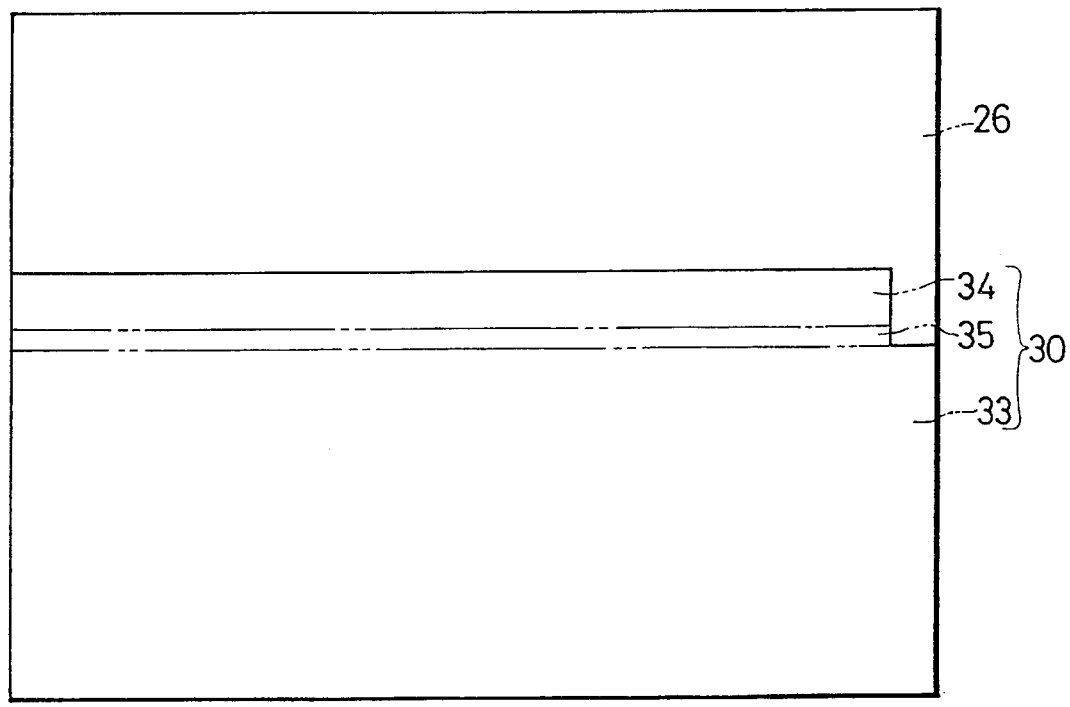
Figure 11:
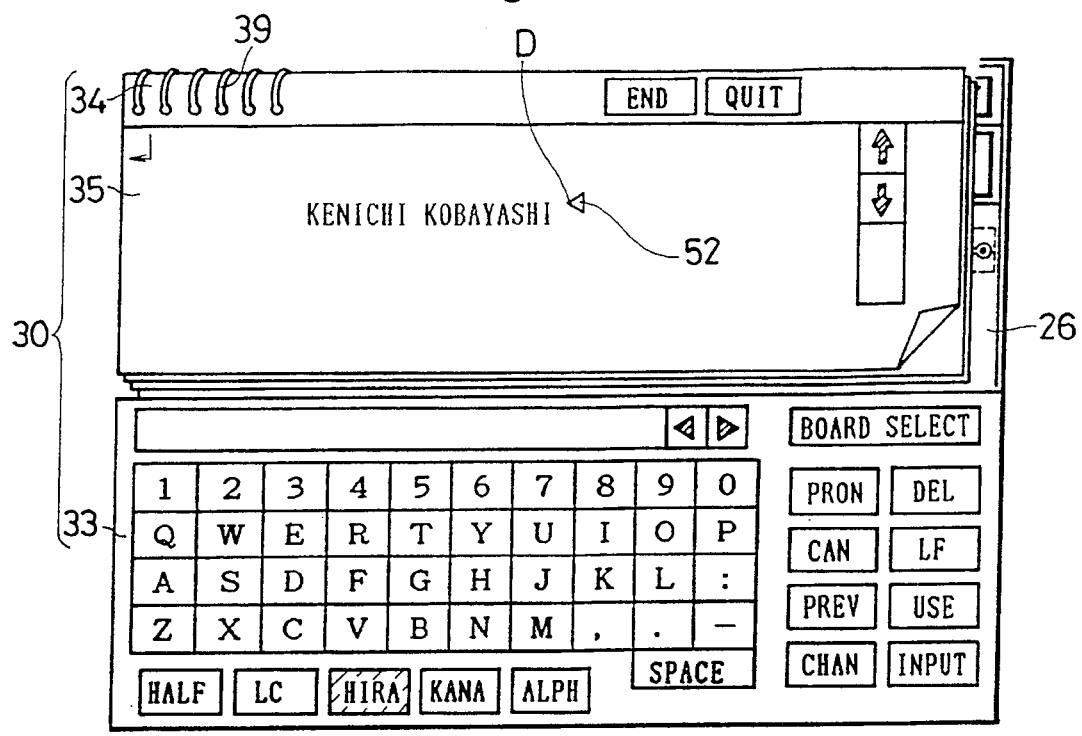
FIGS. 11(1) and (2) are diagrams after moving the action board in the first embodiment of the invention.
Figure 11:
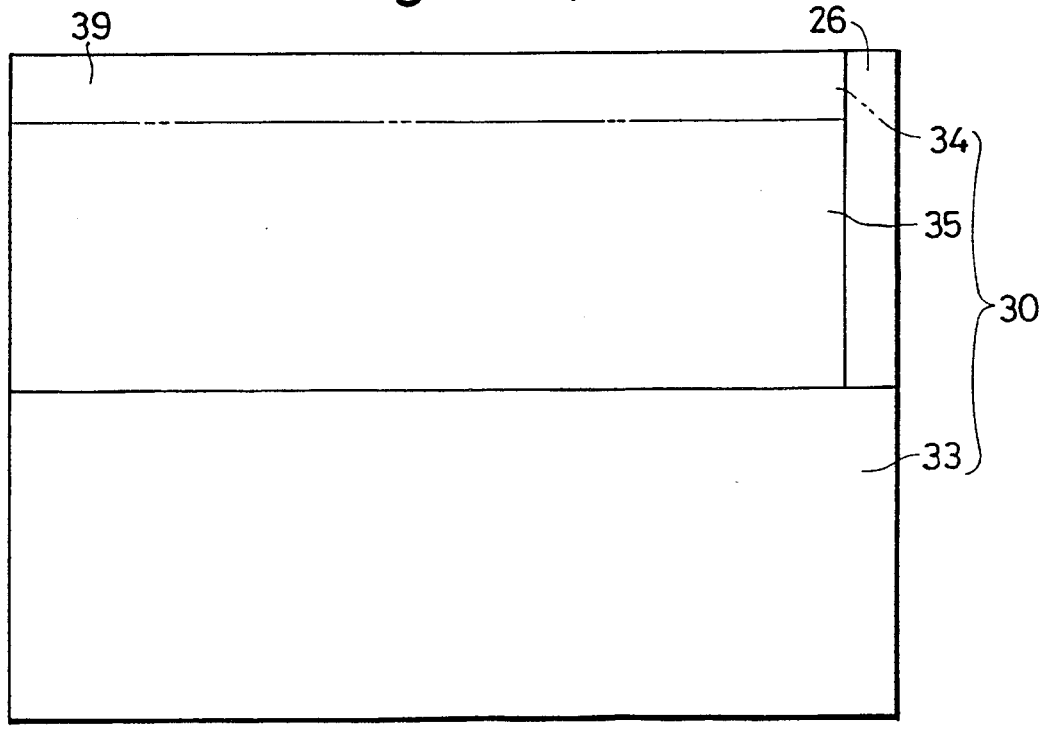

FIG. 10 is a diagram after execution of paste action, FIG. 10(1) is a diagram showing the actual display state, and FIG. 10(2) is a simplified diagram showing the region of the display screen. The majority of the screen 35 of the action board 30 is concealed beneath the keyboard 33 for character input, and the copied KOBAYASHI KENICHI cannot be recognized directly. As shown in FIG. 11, upwards left area 39 of the title area 34 of the action board is moved upwards by dragging in order to confirm the copied KOBAYASHI KENICHI. Thus it is known that KOBAYASHI KENICHI is pasted in the position D. The black rectangle symbol following KOBAYASHI KENICHI is the cursor 52. FIG. 11(1) is a diagram showing the actual display state, and FIG. 11(2) is a simplified diagram showing the region of the display screen.

Thus, as shown in FIG. 8 to FIG. 11, by rubbing and pressing to specify the copy source character string "KOBAYASHI KENICHI" in the business card control region 26, and designating the desired copy destination position D in the action board 30, the copy source character string of "KOBAYASHI KENICHI" can be pasted in the copy destination position D, and thus by these two manipulations, the copy and paste operation is realized, so that the controllability is enhanced.

Figure 12:
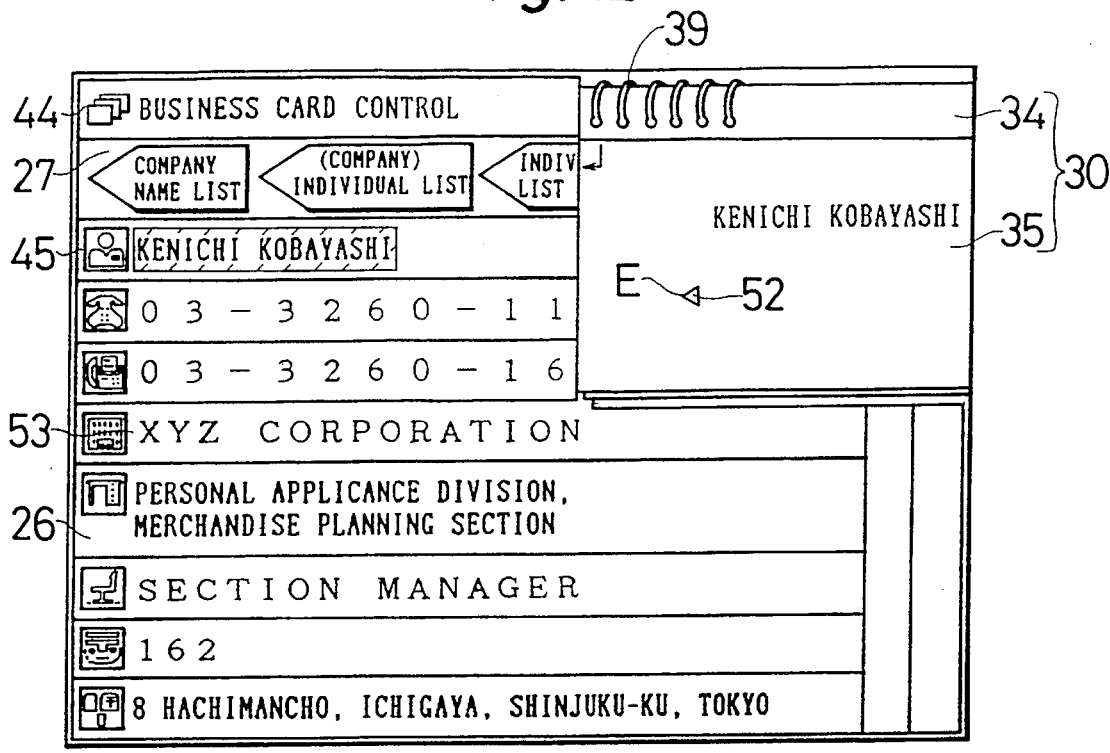
FIG. 12 is a diagram in which the business card control is the object of processing after moving the action board in the first embodiment of the invention.
Figure 13:
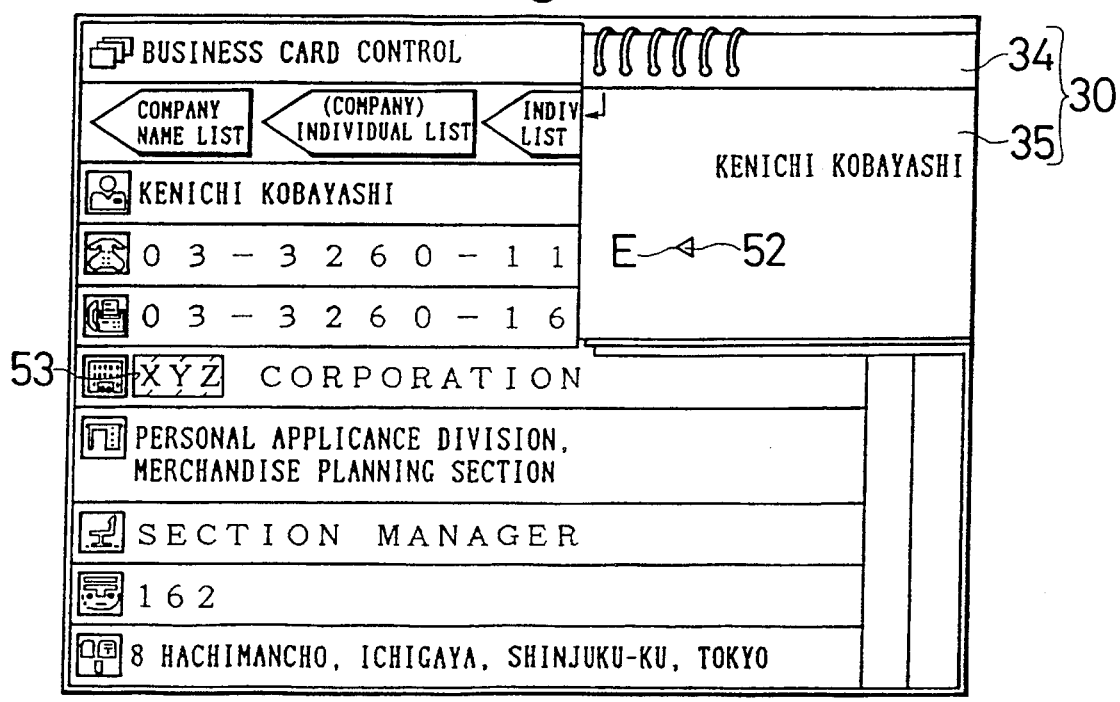
FIG. 13 is a diagram in which the display character data of business card control is specified as copy character string in the first embodiment of the invention.

Referring further to FIG. 12 and FIG. 13, the operation of pasting and copying the "XYZ CORPORATION" stored in the display area 45 of the region of the business card control 26 into the display area 35 of the action board 30 is further described below.

As shown in FIG. 12, while touching the upper left area 39 of the title area 44 of the region of business card control 26, it is moved to the right in the state shown in FIG. 11. At this time, the name 45 of "KOBAYASHI KENICHI" in the copy source remains in reversal state. In order to copy a company name 53 in the business card control 26 into position E of the screen 35 of the action board 30, the position E is touched and the cursor is moved to the position E, and the screen 30 of the action board is moved above the right side of the screen, and the screen of the business card control 26 is touched to select the business card control as the object of processing. Consequently the display character data 53 of company name "XYZ" CORPORATION can be recognized.

In FIG. 13, in order to copy the display character data 53 of company name "XYZ" into the cursor position 52 of the action board 30, "XYZ" is specified therefore the character string "XYZ" is reversely displayed in White-Black manner.

In this way, "XYZ" is pasted as shown in FIG. 14. In FIG. 14, by touching the upper left part (dim characters) of the title area 34 of the action board 30, the action board is selected as the object of processing.

In other embodiment of the invention, instead of pressing the copy destination position E, by pressing the title area 34 of the action board 30 after pressing and indicating the position E, since the touched position is in the title area 34, it is available to paste the copy character string to the cursor position E of the action board 30. That is, in the title area 34, the character string cannot be entered, and it is judged at step S23 by the CFU 1, thereby changing from step S25 to step S26, the character string "XYZ" is copied in the position E indicated by cursor 52. Such embodiment is also included in the spirit of the invention.

Figure 15:
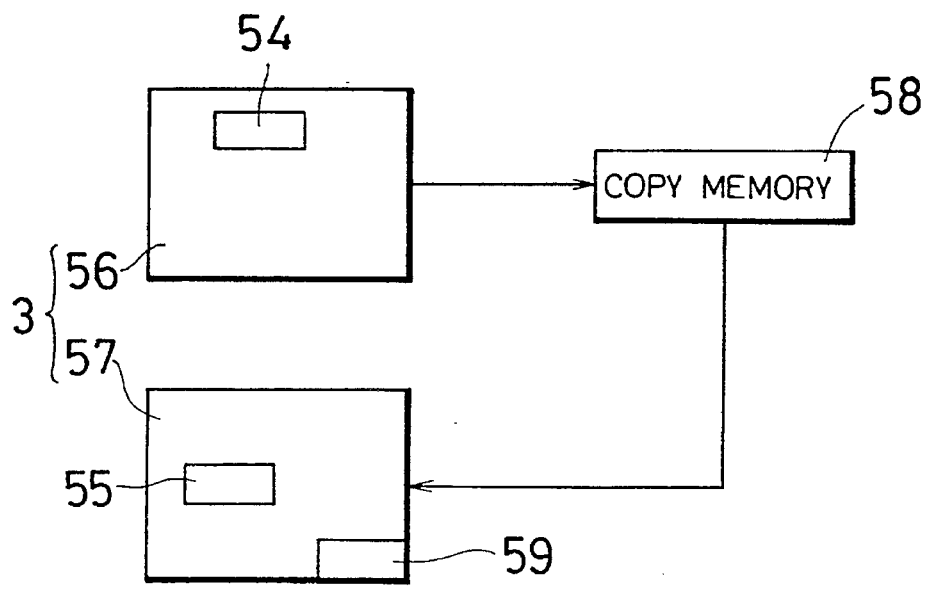
FIG. 15 is a diagram showing the composition of the memory 3 for explaining the operation in FIG. 8 to FIG. 14.
Figure 16:
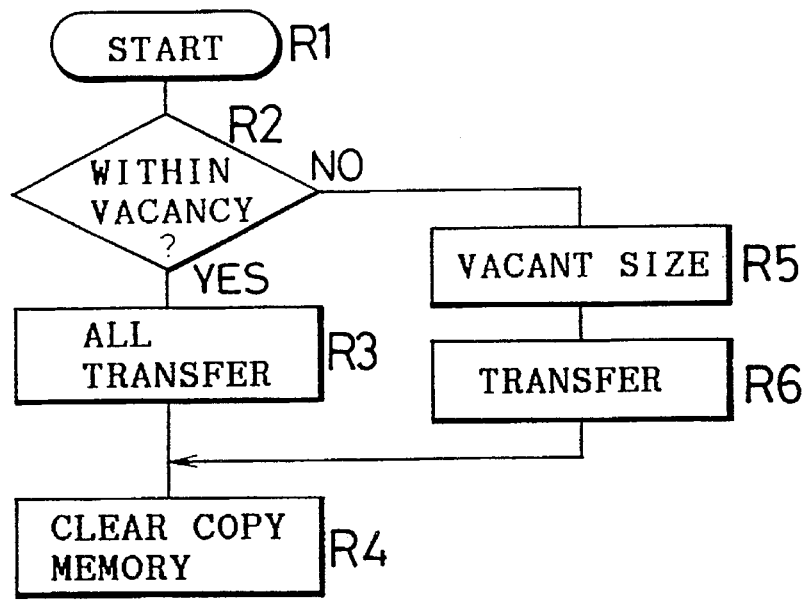
FIG. 16 is a flow chart showing the operation of the CPU 1 for explaining the operation in FIG. 8 to FIG. 14.

FIG. 15 is a simplified diagram of the composition for pasting the copy source content 54 in the display area 45 in the region of the business card control 26, that is, "KOBA-YASHI KENICHI" and "XYZ" into the region 55 in the display area 35 of the action board 30 as mentioned above. In the memory regions 56, 57 of the random access memory 3, the contents of the display areas 46, 35 are stored. By pressing and instructing the content 54 of the copy source character string, the content is transferred into the memory region 58 of the random access memory 3 without erasing the content 54. At this time, the operation by the CFU 1 is as shown in FIG. 16. Transferring from step R1 to step R2, it is judged if the memory region 57 has a vacant store capacity 59 enough for holding the character string to be copied which is stored in the memory region 58. If the copy source character string 54 stored in the memory region 58 is within the capacity of the vacant memory region 59, transferring to step R3,the content of the memory region 58 is transferred to the indicated region 55, and the content of the memory region 58 is cleared at step R4. If the character string at the copy source exceeds the capacity of the vacant memory region 59, transferring to step R5, only the portion capable of being transferred to the vacant memory region 59 is calculated, and the character string is transferred from the memory region 58 for that portion of the region 59 only, and later the content in the memory region 58 is cleared at step R4.

Figure 17:
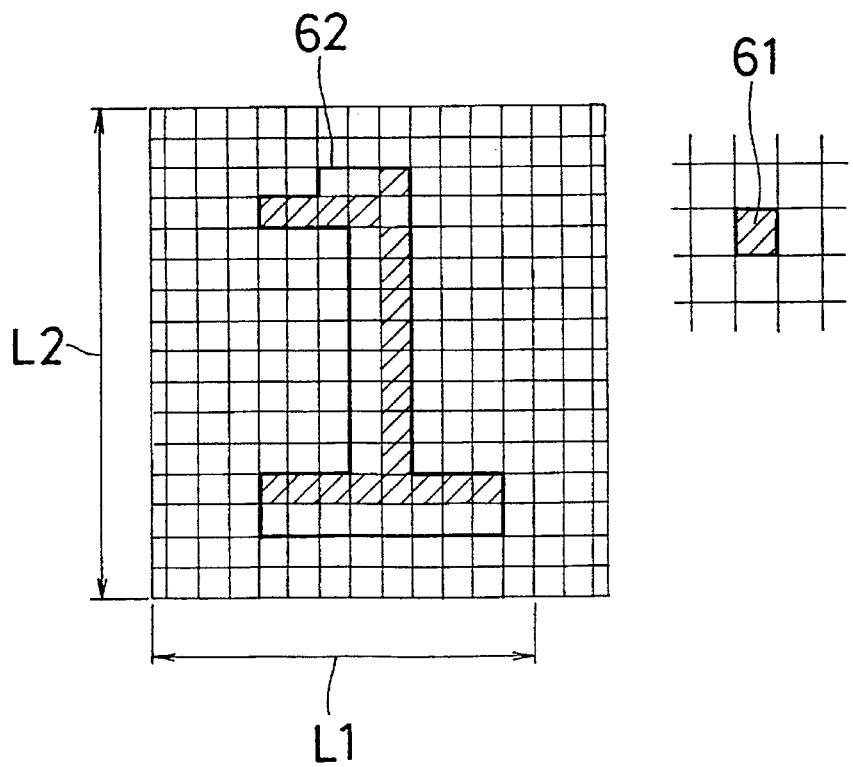
FIG. 17 is a front view for explaining the operation for displaying the character in dark state or displaying the character dimly on the display screen 41.

FIG. 17 is a diagram for explaining the operation when dimly displaying the title area 44 in the region of the business card control 26 mentioned in relation to FIG. 6. In the region of each character in a size of lateral L1×vertical L2, each pixel of liquid crystal may be displayed in black, the background in white, so that the character "1" 62 may be displayed densely. By contrast, for dim display, only the region of the character "1" 62 indicated by shaded area is displayed in black, and the remaining portion is displayed in white same as the background, so that a dim display is obtained. Thus, dim display is realized by decimating some of the pixels in the regions of dense display and displaying in white. The reversal display means display of white characters in a black background.

In the foregoing embodiment, a desired character string is selected from the display area 45 in the region of the business card control 26, and it is copied and pasted into the display area 35 as the copy destination in the action board 30 from the region of the business card control 26 as the copy source, and thus the desired limited information out of much information in the display area 45 is copied in the display area 45 of the action board 30, so that the required information may be recognized at a glance.

In other embodiment of the invention, it is also possible to display the auxiliary display area 37 in the display area 35 of the action board 30 by manipulating the keyboard unit 36 of the input unit 33, write the content of the auxiliary display area 37 into a desired position in the display area 35 by manipulating the input key 38, paste the information in the display area thus written randomly into a desired region, for example, in the display area 45 of the business card control 26, or copy and paste into a telephone book, schedule book or other region, and thus the content once entered into the display area 35 can be pasted into the display area of the business card control 26, or into the telephone book or schedule book, without having to enter again.

Figure 23:
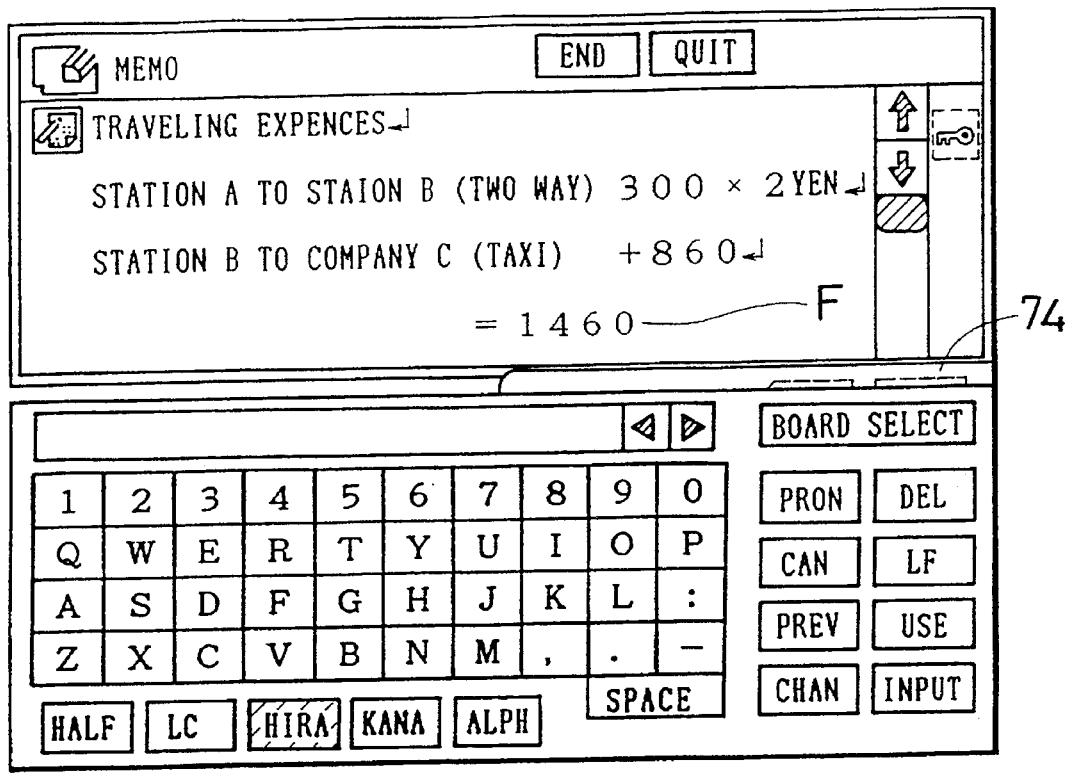
FIG. 23 is a diagram of pasting the result of operation in the memo in the second embodiment of the invention.

The second embodiment of the data processing apparatus of the invention is described in detail by referring to drawings. As shown in FIG. 18, the screen information entering the display area 68 by the keyboard 67 includes numerals, arithmetic symbols ×, +, = and /, and other characters, and only numerals and arithmetic symbols are selected from these characters and the calculation of $$300 \times 2 + 860 = 1460$$

is operated, and the result of operation is displayed after the symbol "=" in FIG. 23(1).

That is, in an application of handling numerical values like calculator, when making a copy input after specifying the copy character string (characters, numerical values, operation symbols such as +, −, ×, ÷, =) the application invalidates the character strings other than the copy object depending on the display data in the copy source display screen, and operates the copy character string of the copy object characters.

FIG. 18 is a communication statement entered in the "memo," showing the screen in the process of input of the display characteristic data of traveling expenses. FIG. 18(1) is a diagram showing the content displayed on the screen 41, and FIG. 18(2) is a diagram showing its display region. Of the application keys 43, by pressing the memo key 22, as shown in FIG. 18, a display region 70 composed of a title area 69 and a display area 68, and an input area 72 composed of the keyboard unit 67 and auxiliary display area 71 are displayed. The display is shown in the auxiliary display area 71 by pressing the numeric keys, arithmetic symbol keys, and other keys, such as alphabet keys in the keyboard unit 36, and moreover by manipulating an employ key 73, the display is shown in the display area 58 of the display region 70. Thus, the display as shown in FIG. 18 is made.

Figure 19:
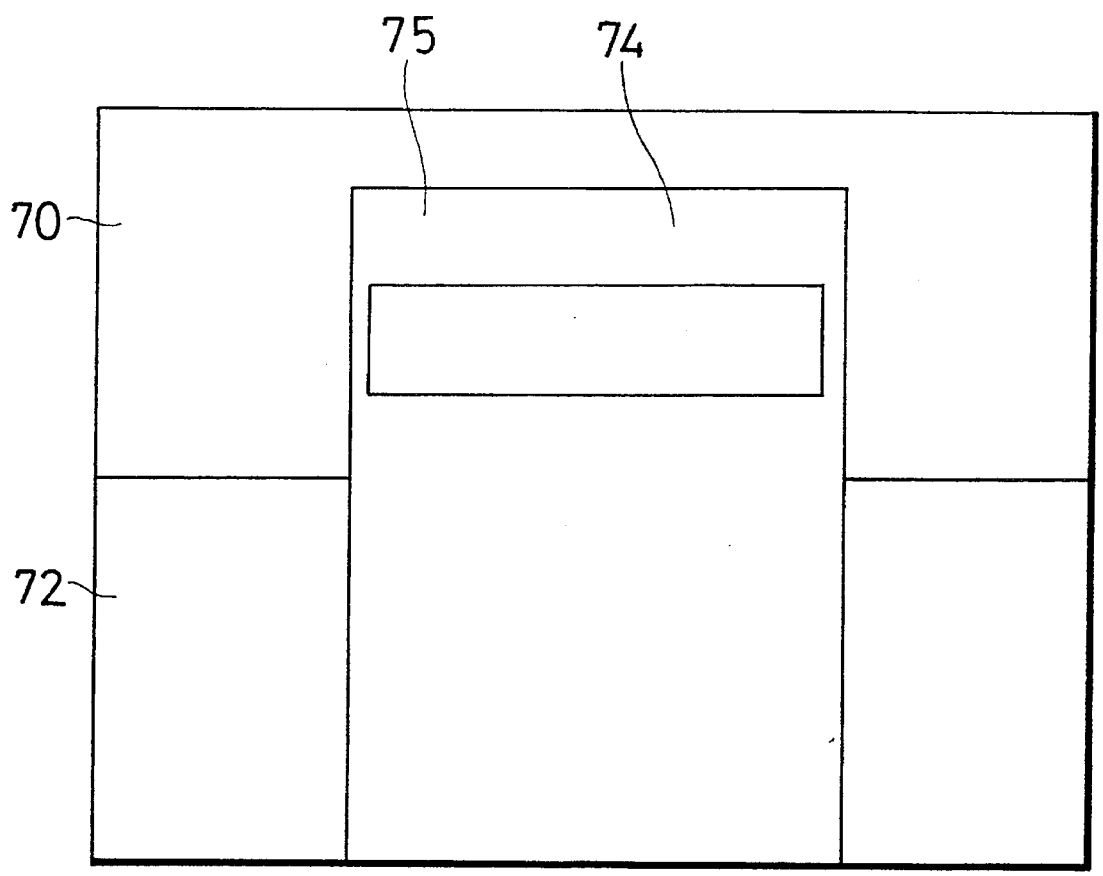
FIG. 19 is a diagram showing a display screen obtained when a calculator key 24 is manipulated in the display state in FIG. 18.

Incidentally, of the application keys 43, by pressing the calculator key 24, as shown in FIG. 19, the display region 72 showing a part of the calculator is displayed. In FIG. 19, the display regions 70, 72, 74 are shown in simplified form. Herein, by pressing the upper left part 75 of calculator display area 74 to move to the lower right part of the display screen 41, the screen as shown in FIG. 20 is obtained. FIG. 20(1) shows a specific display content of the screen 41, and FIG. 20(2) shows the display region in a simplified form. The calculator region 74 contains the keyboard unit 76 and auxiliary operation display unit 78. FIG. 20 is a diagram showing that a portion screen 74 of the calculator (operating machine) is displayed by pressing the calculator key 24 in state of FIG. 18, and moved to the lower right corner. To move the screen 74 of the calculator, the upper left corner 75 of which is dragged. To erase the calculator 74 from the screen, the "quit" key 79 on the calculator screen is touched while the calculator is the object of processing. In this embodiment, in order to calculate and determine the traveling expenses, by two-way travel between station A and station B, 300 yen×2 is calculated, which must be summed up with the taxi fare from station B to company C.

Figure 21:
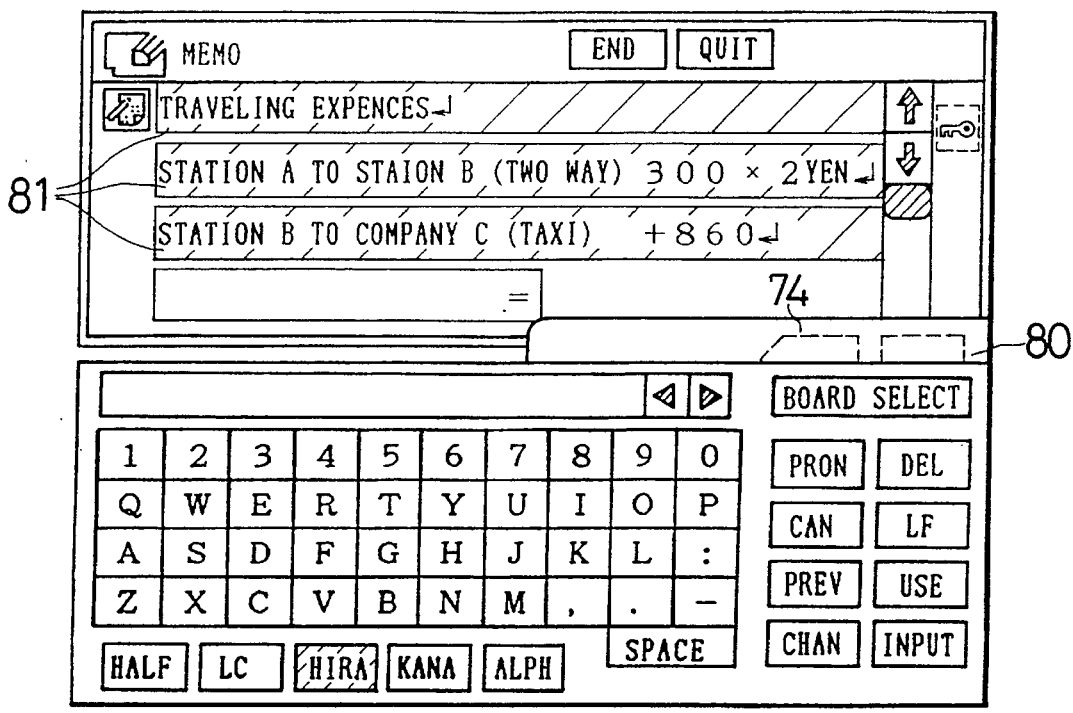
FIGS. 21(1) and (2) are diagrams of specifying the display character data of "memo" as copy character string in the second embodiment of the invention.
Figure 21:
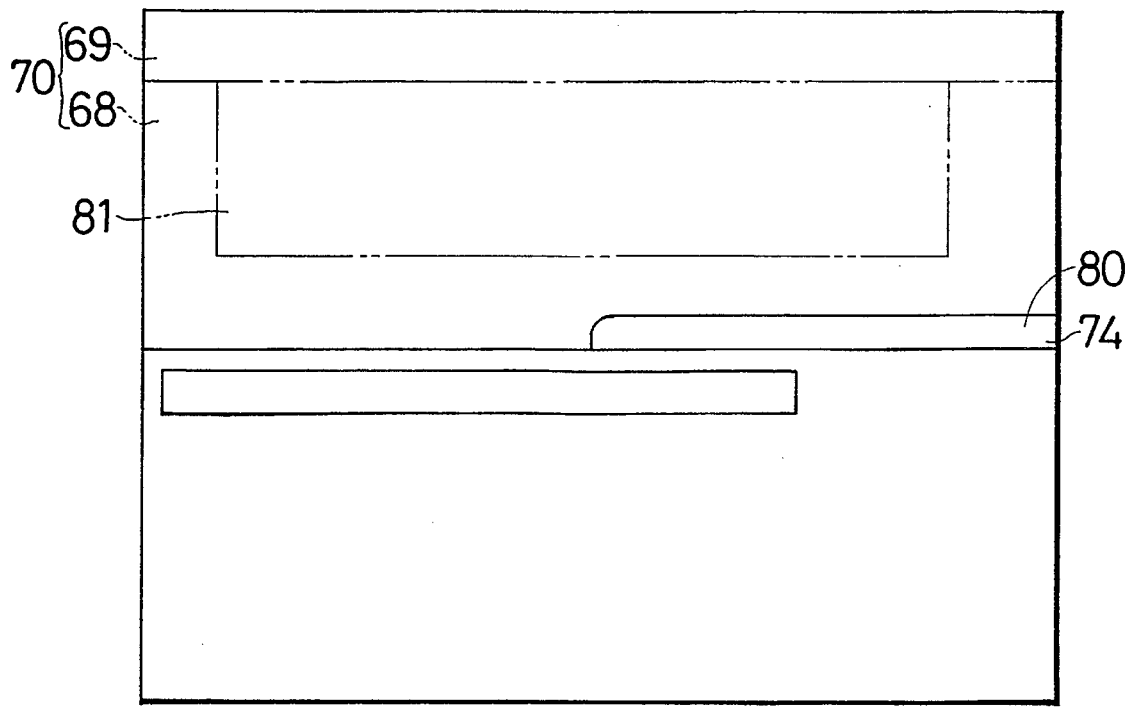

In FIG. 21, to calculate the traveling expenses in the memo, the memo screen is touched to select the memo as the object of processing, and the character string is selected from the beginning till the end as the copy character string.

The title display area 69 of the memo screen is a dark display as usual showing the object of processing, and the title display area 80 of the calculator 74 is dimly lit to tell it is not the object of processing. In FIG. 21, the character string to be operated of the display area 68 of the memo screen 70 is indicated by reference to number 81, showing the White-Black reversed state after pressing and instructing. As mentioned above, by pressing a part of the memo region 70, the calculator 74 is concealed beneath the input area 72, except for the title area 80.

Figure 22:
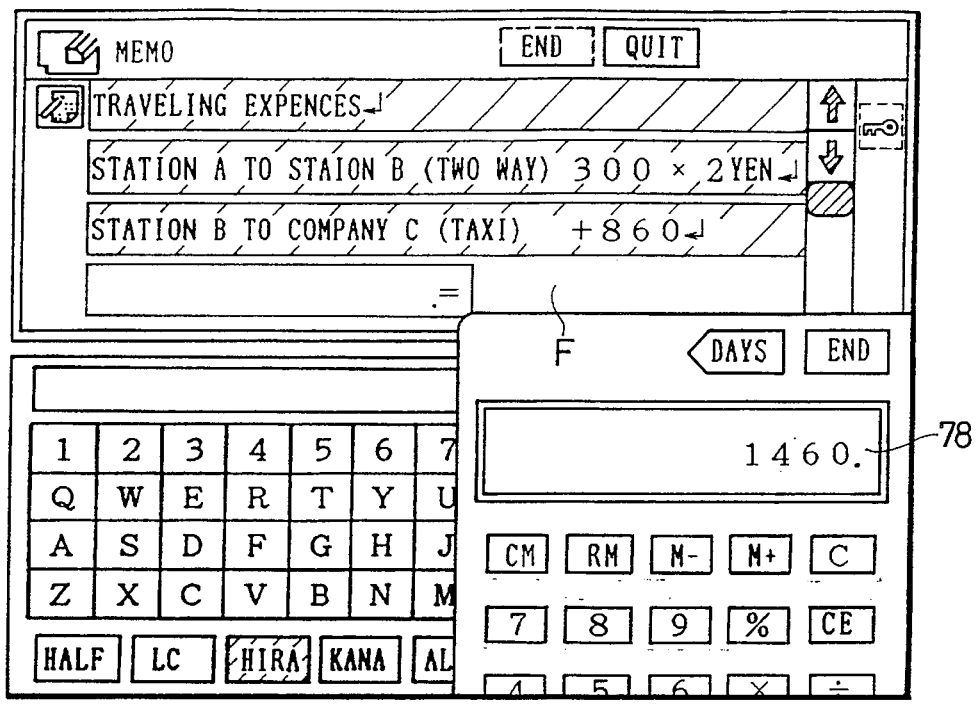
FIGS. 22(1) and (2) are diagrams of operating by the operating machine from the copy input in the second embodiment of the invention.
Figure 22:
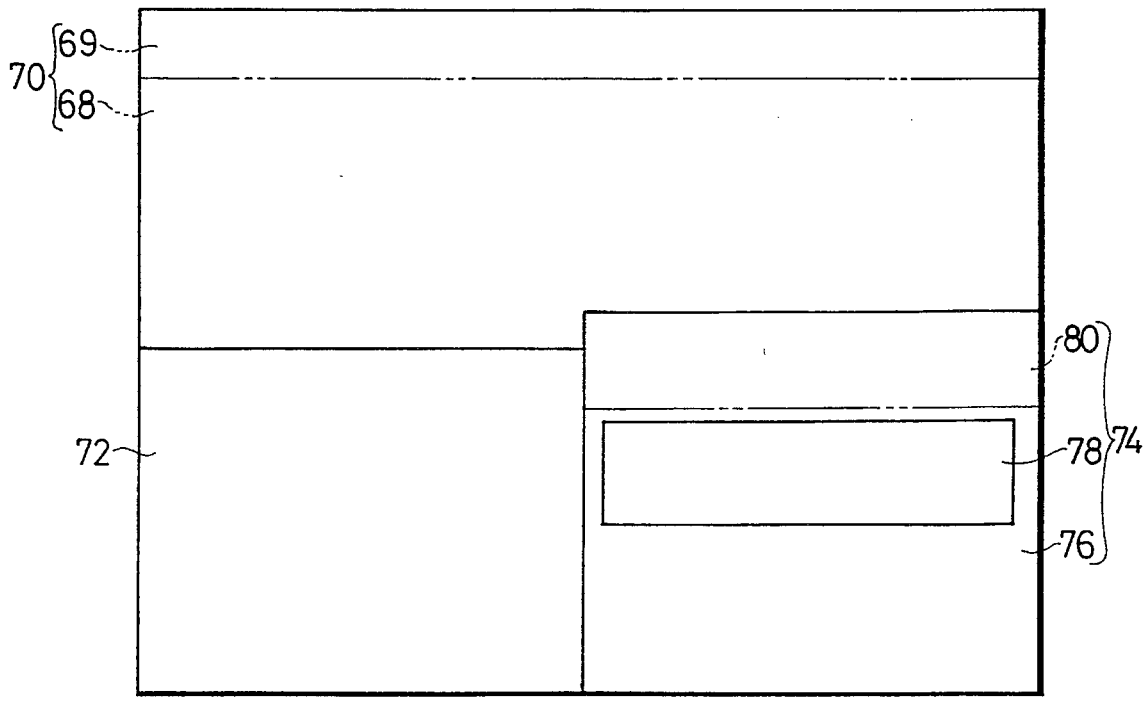

As shown in FIG. 22, the screen of the calculator 74 is touched with the calculator being selected as the object of processing, then only the copy object is entered in calculator for operation. When only the copy object is entered, all characters not found in the input keys of the calculator (kanji, hiragana, alphabet, etc.) are ignored, and only the characters corresponding to the input keys of the calculator (full size characters and half-size characters are regarded as identical) are picked up, and operated. Therefore, by actuating the function of the calculator displayed on the screen, numerals 0 to 9 and symbols +, −, ×, ÷, = and others are operated, and the result is displayed. The result of operation is shown in the display area 78 of the calculator region 74. Such operation result is reversely displayed in White-Black manner in the display area 78. Next, by pressing the position F to display the operation result of the display area 68, the operation result shown in the display area 78 can be displayed in position F. This position F is after the arithmetic symbol "=". Thus, the screen in FIG. 23 is obtained. To return the result of operation to the memo, the portion displaying the result of operation by the calculator is touched, and the result of operation is pasted to the memo input position by touching. The operation result by the calculator is stored as copy character string in half-size characters internally.

Figure 24:
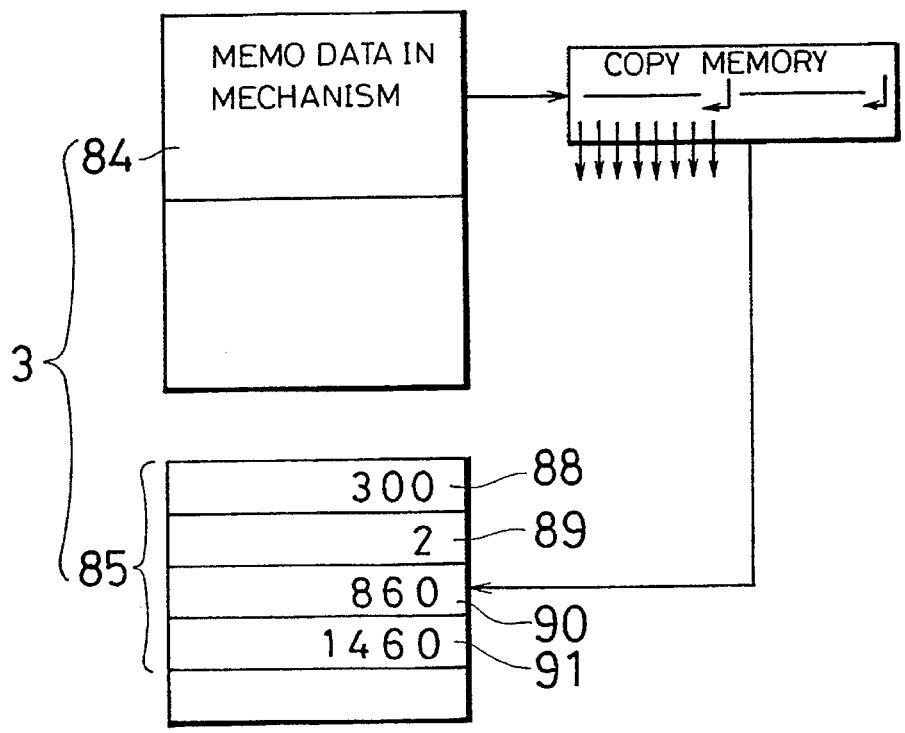
FIG. 24 is a diagram showing the composition of the memory 3 for explaining the operation in FIG. 18 to FIG. 23.
Figure 27:
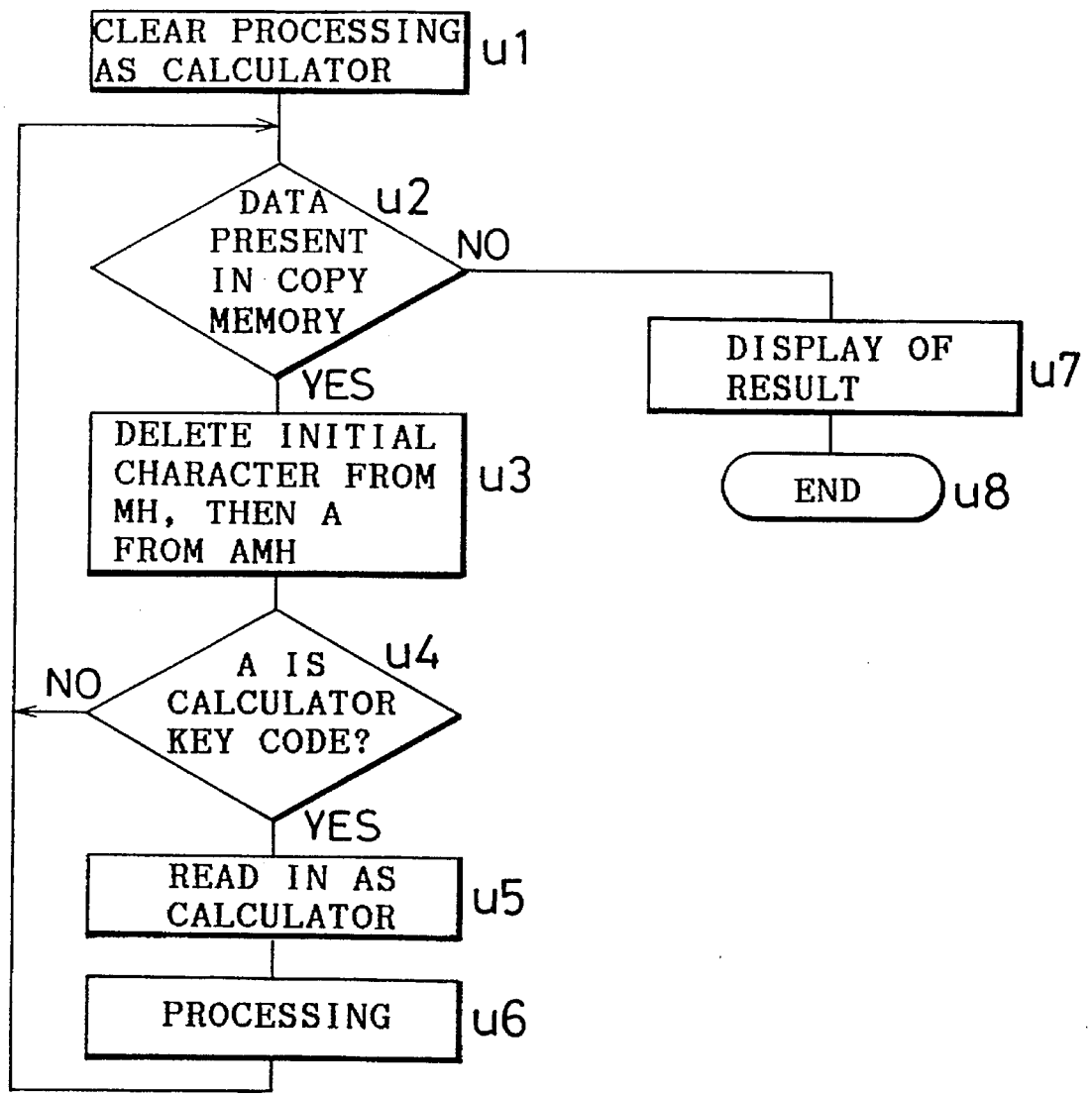
FIG. 27 is a flow chart of CPU 1 for explaining the operation in the embodiment shown in FIG. 18 to FIG. 23.

FIG. 24 is a simplified diagram showing the composition for performing operations in FIG. 18 to FIG. 23. Memories 84, 85 are part of the random access memory 3, and a copy memory 86 forms part of the memory 3, too. By manipulating the keyboard unit 67 of the input unit 72, a display is shown in the auxiliary operation display unit 71, and then by manipulating the employ key 73 as mentioned above, the data shown in the display unit 58 is stored in the memory 84. Of the stored content in the memory 84, by instructing the content to be operated as indicated by reference to number 81 in FIG. 21, the content in the region 81 is transferred to the memory 85, and the content in the memory 84 remains stored therein. The stored content transferred to the memory 86 is as shown in FIG. 25. Symbol 87 refers to line feed. Such content in the memory 86 is read out sequentially, and of these characters, only numerals and arithmetic symbols are distinguished, and taken out as shown in FIG. 26, and stored in the operation registers 88 to 90 in the memory 85 respectively, and the arithmetic symbols are also stored. FIG. 27 is a diagram for explaining the operation of the CPU 1. In arithmetic processing of the calculator, first at step u1, clear processing is done, and at next step u2, when it is judged that the data stored in the copy memory 86 is present, going to next step u3, the characters are sequentially read out from the memory 86, and the characters in the memory 85 after being read out are erased. At step u4, each character being read out from the memory 85 is judged if it is a key code for the calculator, that is, if it is any of the numerals and arithmetic symbols used in the calculator operation. If the numeral being read out from the memory 86 is any specified numeral or arithmetic symbol, going to next step u5, it is read out as shown in FIG. 26 and read into the operation registers 88 to 90. At subsequent step u6, on the basis of the arithmetic symbols, the contents in the operation registers 88 to 90 are calculated. When the content in the memory 86 is all used up, moving from step u2 to step u7, the operation result is stored in the operation register 91, and the content is displayed in the display area 78 of the calculator screen 74 as mentioned above. This content 78 may be transferred and displayed in the indicated position F as mentioned above.

Figure 28:
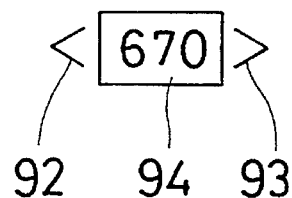
FIG. 28 is a diagram of other embodiment of the invention showing the content to be entered in a display part 68 in FIG. 18.
Figure 29:
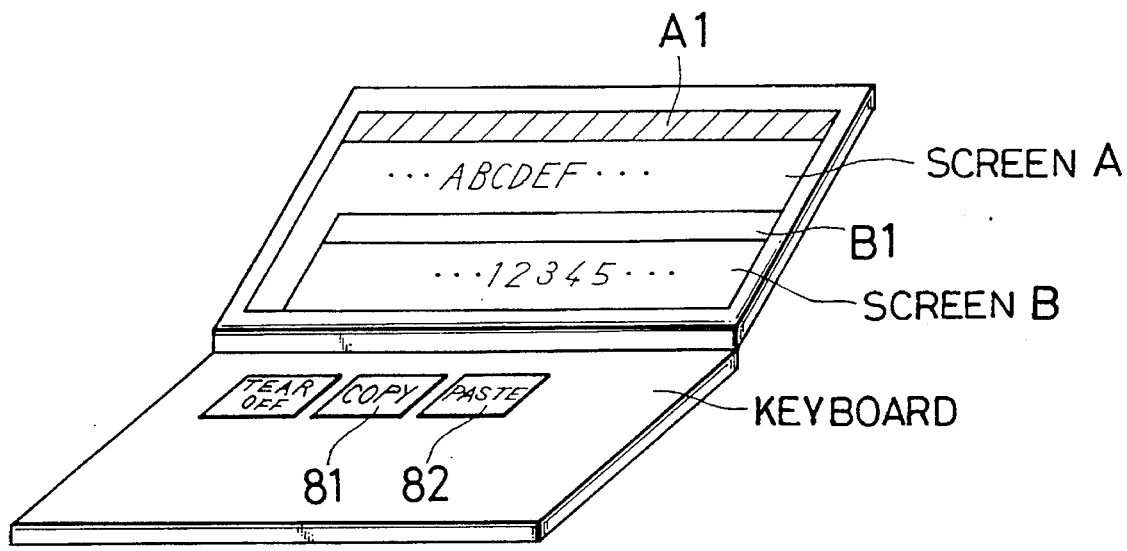
FIG. 29 is a diagram showing a display device in data processing apparatus in a prior art.
Figure 30:
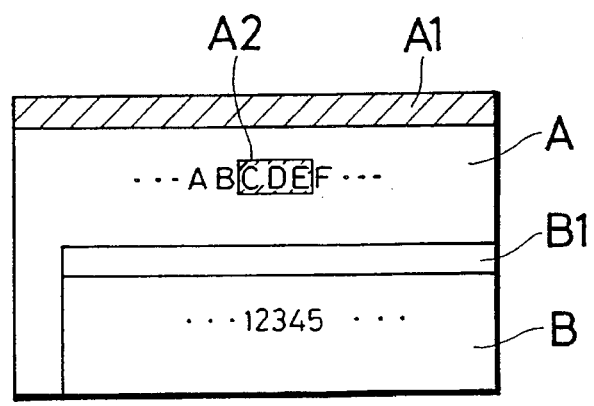
FIG. 30 is a diagram specifying a copy character string in data processing apparatus in the prior art.
Figure 31:
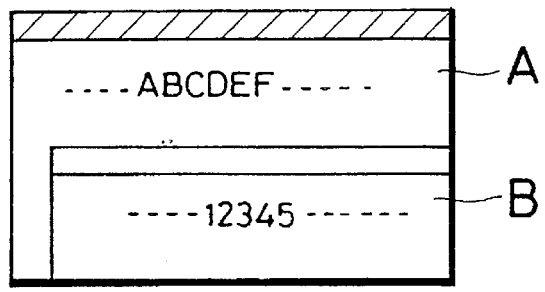
FIG. 31 is a diagram when copy key is pressed in data processing apparatus in the prior art.
Figure 32:
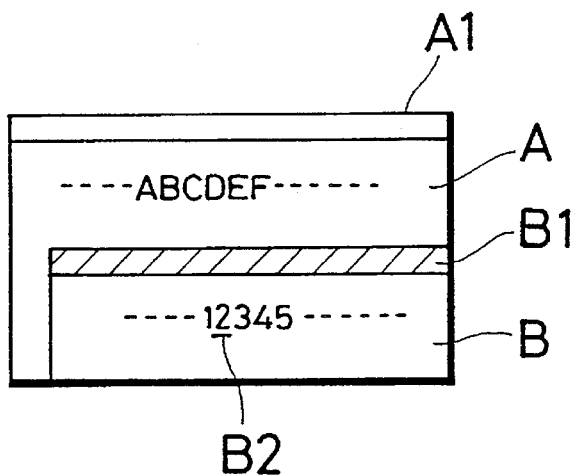
FIG. 32 is a diagram of moving the object of processing in data processing apparatus in the prior art.
Figure 33:
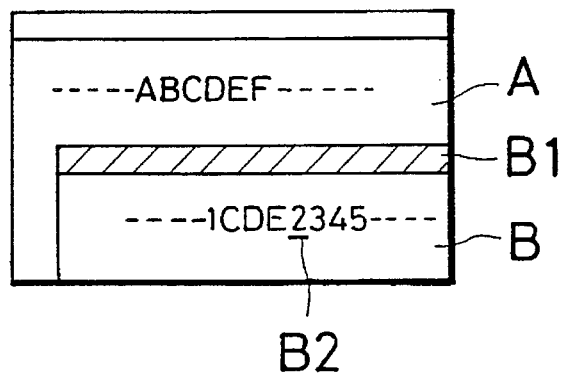
FIG. 33 is a diagram of executing the copy input in data processing apparatus in the prior art.

In other embodiment of the invention, if a numeral is present in the characters shown in the display area 68 of the memo region 70, as shown in FIG. 28, by using symbols 92, 93, the numeral 94 enclosed by the symbols 92, 93 is not used in step u4 for calculator operation processing. Hence, the numeral 94 may be used for a memory different from calculation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A data processing apparatus comprising:

display means for displaying information of plural screens on one display screen, one of the plural screens being a copy source screen and another of the plural screens being a copy destination screen;

cursor position specifying means for specifying a cursor position in a copying area of the copy destination screen;

means for storing a character string of the copy source screen;

copying character string designating means for designating a portion of the character string; and means for copying the designated character string portion into the specified cursor position of the copy destination screen in response to solely the specifying of the cursor position by said cursor position specifying means, and without intermediate user input into said apparatus between said designating of the character string portion and said copying.

2. The data processing apparatus as claimed in claim 1, wherein the means for specifying the cursor position and the copying character string specifying means are transparent touch panels laid over the display screen of the display means, wherein the touch panels are composed of switching elements smaller than the size of each character display on the screen being displayed in a matrix.

3. The data processing apparatus of claim 1, wherein said means for copying copies the designated character string portion without additional user input prior to the specifying of the cursor position by said cursor position specifying means, such that the copying is executed in only two steps on the part of the user.

4. A data processing apparatus comprising:

means for displaying information of plural screens on one display screen, one of the plural screens being a copy source screen and another of the plural screens being a copy destination screen;

cursor position specifying means for specifying a cursor position in a copying area of the copy destination screen;

means for storing a character string of the copy source screen;

copy character string designating means for designating a portion of the character string;

judging means for judging whether the designated character string portion is a copiable region of the display screen or not; and copying means for copying the character string portion into the specified cursor position in response to the judging means, said judging means and said copying means being activated after said copying character string designating means designates the character string portion and solely in response to the specifying of the cursor position by said cursor position specifying means.

5. The data processing apparatus as claimed in claim 1 or 4, wherein the character string of the copy source screen includes characters displayed on the copy source screen, and only the displayed characters may be specified by said copy character string specifying means as valid characters copiable to the specified cursor position.

6. A data processing apparatus comprising:

means for displaying information of plural screens on one display screen, one of the plural screens being a copy source screen and another of the plural screens being a copy destination screen;

cursor position specifying means for specifying a cursor position in a copying area of the copy destination screen;

means for storing a character string of the copy source screen;

copying character string designating means for designating a portion of the character string, the character string portion including at least one mathematical expression;

means for copying the character string portion into the specified cursor position in response to said copying character string designating means and said cursor position specifying means; and arithmetic means, responsive to said means for copying, for operating according to the at least one mathematical expression included in the copying character string when copying.

7. A data processing apparatus comprising:

means for displaying information of plural screens on one display screen, one of the plural screens being a copy source screen and another of the plural screens being a copy destination screen;

means for specifying the cursor position in a copying area of the copy destination screen;

means for storing a character string of the copy source screen;

copying character string designating means for designating a portion of the character string to be copied, the character string portion including at least one mathematical expression;

judging means for judging whether the designated character string portion is a copiable region of the display screen or not, in response to the copying character string designating means;

means for copying the character string portion into the specified cursor position in response to the judging means; and arithmetic means for operating according to the at least one mathematical expression included in the copying character string portion when said copying means copies the character string portion.

8. The data processing apparatus as claimed in claim 6 or claim 7, wherein the cursor specifying means is composed of a touch panel.

9. An arithmetic apparatus comprising:

display means for displaying screen information;

means for inputting numerals, arithmetic symbols and other characters;

a memory for storing the input numerals, arithmetic symbols, and other characters entered by the input means, and the information displayed in the display means;

operation instructing means for running an instruction of operation; and arithmetic means for reading out the stored contents of said memory, in response to an output of the operation instructing means, and for distinguishing numerals, arithmetic symbols and other characters, and performing an arithmetic operation according to the distinguished numerals and arithmetic symbols.

10. The arithmetic apparatus as claimed in claim 9, wherein an arithmetic result of the arithmetic operation of said arithmetic means is displayed in a predetermined position in the display means.

11. The arithmetic apparatus as claimed in claim 9, wherein:

a combination of numerals and predetermined symbols other than numerals is entered by the input means; and the numerals contained in the combination are distinguished by the arithmetic means, and are not used by the arithmetic means when performing the arithmetic operation according to numerals and arithmetic symbols.

12. A data copying method comprising the steps of:

(a) displaying a copy source screen and a copy destination screen;

(b) designating a character string portion to be copied from the copy source screen;

(c) specifying, immediately after step (b), a position of the copy destination screen to be copied to; and (d) copying, in response to step (c), the designated character string portion into the specified position to be copied to, such that the character string portion is copied in only two steps.

13. The data copying method as claimed in claim 12, wherein the head part of the character string to be copied is located for copying in the specified position to be pasted in.

14. A data processing method comprising the steps of:

(a) displaying a character string including a representation of at least one mathematical process;

(b) designating a part or all of the character string displayed in step (a), including one of the at least one mathematical process;

(c) performing a calculation in accordance with the mathematical process included in the character string specified in step (b) thereby producing a calculating result; and (d) outputting the calculating result.

15. The data processing method as claimed in claim 13 further comprising the steps of:

(e) specifying a position in the screen where the calculating result is to be displayed, and (f) displaying the calculating result in the specified position.

16. The data processing method as claimed in claim 15 wherein said step (c) operates in response to said step (e).

17. A data processing apparatus comprising:

means for displaying information of plural screens, one of the plural screens being a copy source screen and another of the plural screens being a copy destination screen;

means for specifying a cursor position in an area of the copy destination screen;

means for storing a character string of the copy source screen;

means for designating a portion of the character string, the portion including characters representing numerals and arithmetic symbols forming an arithmetic expression;

arithmetic means for operating according to the arithmetic expression included in the designated character string portion and producing a result, said arithmetic means operating in response to said means for specifying a cursor position; and means for copying the produced result into the copy destination screen.

18. The data processing apparatus as claimed in claim 17, wherein said means for copying copies the produced result into a predetermined area of the copy destination screen.

19. The data processing apparatus as claimed in claim 17, wherein said means for specifying a cursor position further specifies a cursor position in an area of the copy source screen, and said means for copying copies the result into the copy source screen.

20. A data copying method comprising the steps of:

(a) displaying information on a display;

(b) designating a portion of the information displayed on the display;

(c) specifying, immediately after step (b), a position on the display where the designated information of step (b) is to be copied to; and (d) copying, in response to step (c) and without further input from the user, the designated information of step (b) into the specified position of step (c) such that the designated information is copied in only two steps.

21. A data processing apparatus comprising:

display means for displaying information;

means for storing displayed information of the display means;

means for designating, by a single user input, a portion of the displayed information;

means for specifying a cursor position on said display means; and means for copying the designated portion into the specified cursor position of the display means in response to solely the specifying of the cursor position.

* * * * *